(12) United States Patent
Naruse

(10) Patent No.: US 9,710,211 B2
(45) Date of Patent: Jul. 18, 2017

(54) PRINTING SYSTEM, INFORMATION PROCESSING APPARATUS, CONTROL METHOD, AND STORAGE MEDIUM

(71) Applicant: CANON KABUSHIKI KAISHA, Tokyo (JP)

(72) Inventor: Taketomo Naruse, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/673,619

(22) Filed: Mar. 30, 2015

(65) Prior Publication Data

US 2015/0278564 A1 Oct. 1, 2015

(30) Foreign Application Priority Data

Apr. 1, 2014 (JP) .................................. 2014-075828

(51) Int. Cl.
| | |
|---|---|
| *G06K 7/10* | (2006.01) |
| *G06F 3/12* | (2006.01) |
| *H04N 1/00* | (2006.01) |
| *G06Q 10/08* | (2012.01) |
| *H04W 4/00* | (2009.01) |

(52) U.S. Cl.
CPC ........... *G06F 3/1292* (2013.01); *G06Q 10/08* (2013.01); *H04N 1/00* (2013.01); *H04W 4/008* (2013.01)

(58) Field of Classification Search
USPC .............. 235/492; 358/1.14, 1.15; 340/10.51
See application file for complete search history.

(56) References Cited

U.S. PATENT DOCUMENTS

| | | | | |
|---|---|---|---|---|
| 2009/0210931 | A1* | 8/2009 | Hashimoto | G06F 21/35 726/4 |
| 2013/0145420 | A1* | 6/2013 | Ting | H04L 63/08 726/1 |
| 2013/0222839 | A1* | 8/2013 | Armstrong | G06F 3/1203 358/1.14 |
| 2015/0160897 | A1* | 6/2015 | Mori | G06F 3/1204 358/1.13 |
| 2015/0261483 | A1* | 9/2015 | Kato | G06F 3/1236 358/1.15 |
| 2015/0278564 | A1* | 10/2015 | Naruse | G06F 3/1292 340/10.51 |

FOREIGN PATENT DOCUMENTS

JP 2013186505 A 9/2013

* cited by examiner

*Primary Examiner* — Allyson Trail
(74) *Attorney, Agent, or Firm* — Canon U.S.A., Inc. IP Division

(57) ABSTRACT

An information processing apparatus on which a non-contact IC tag can be mounted transmits information to a terminal apparatus when a state of the information processing apparatus changes. The information is the changed information which should be written to the non-contact IC tag.

20 Claims, 20 Drawing Sheets

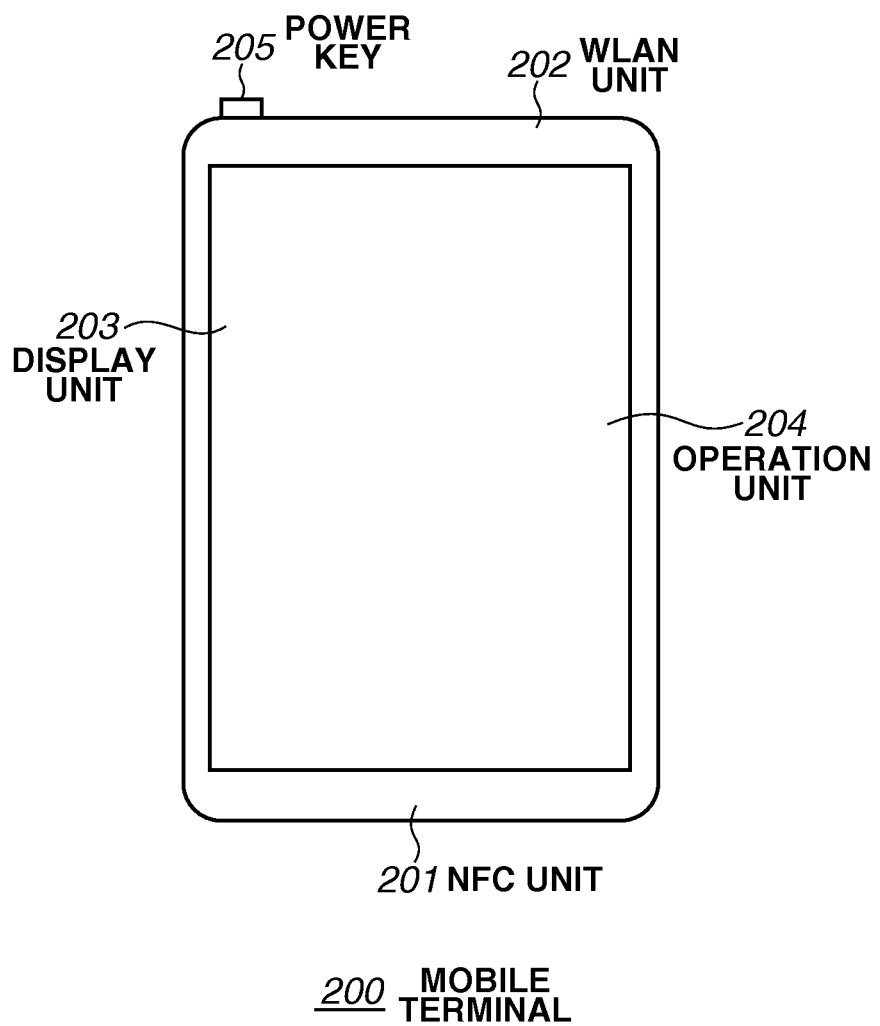

MFP OUTLINE VIEW

MFP TOP VIEW

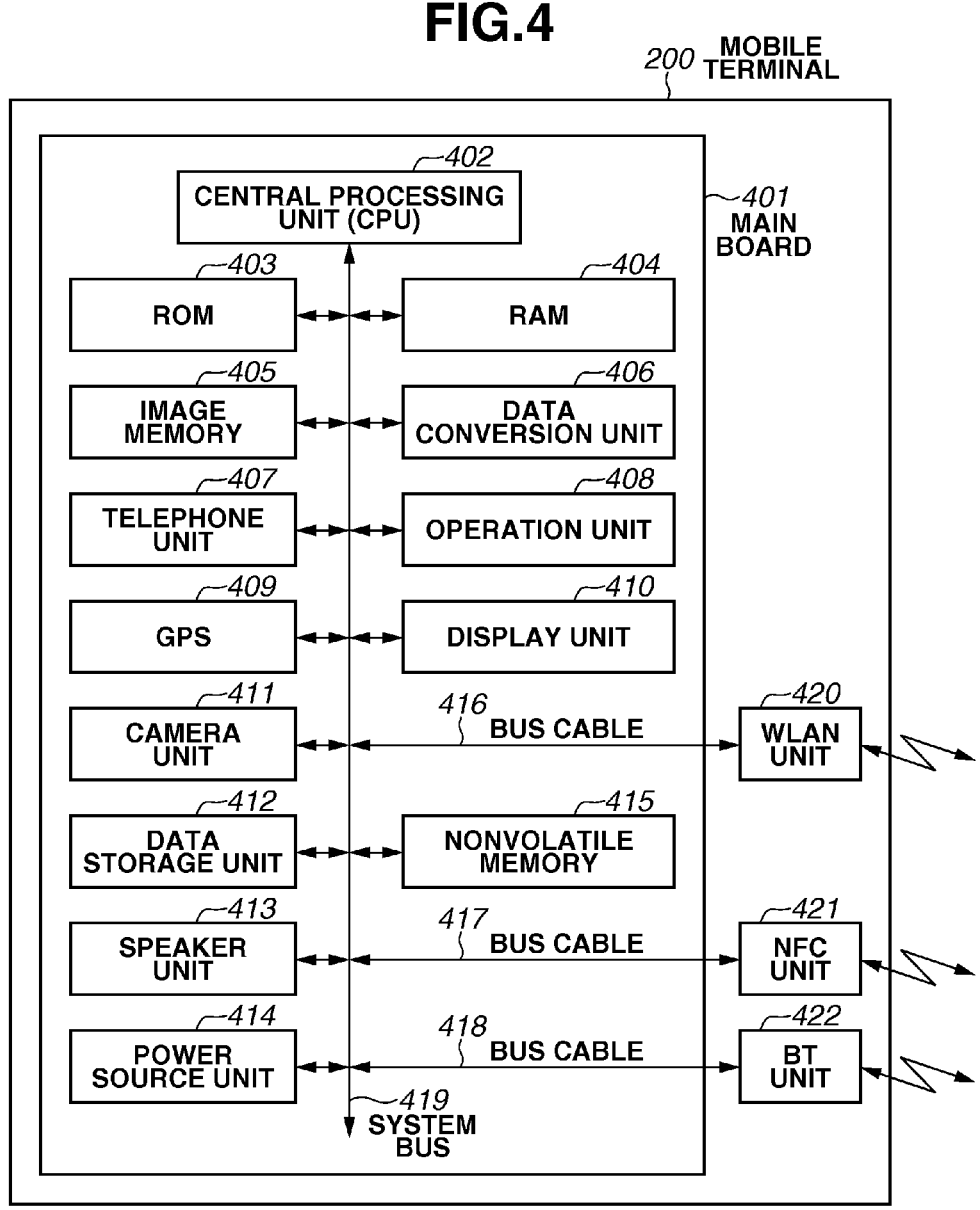

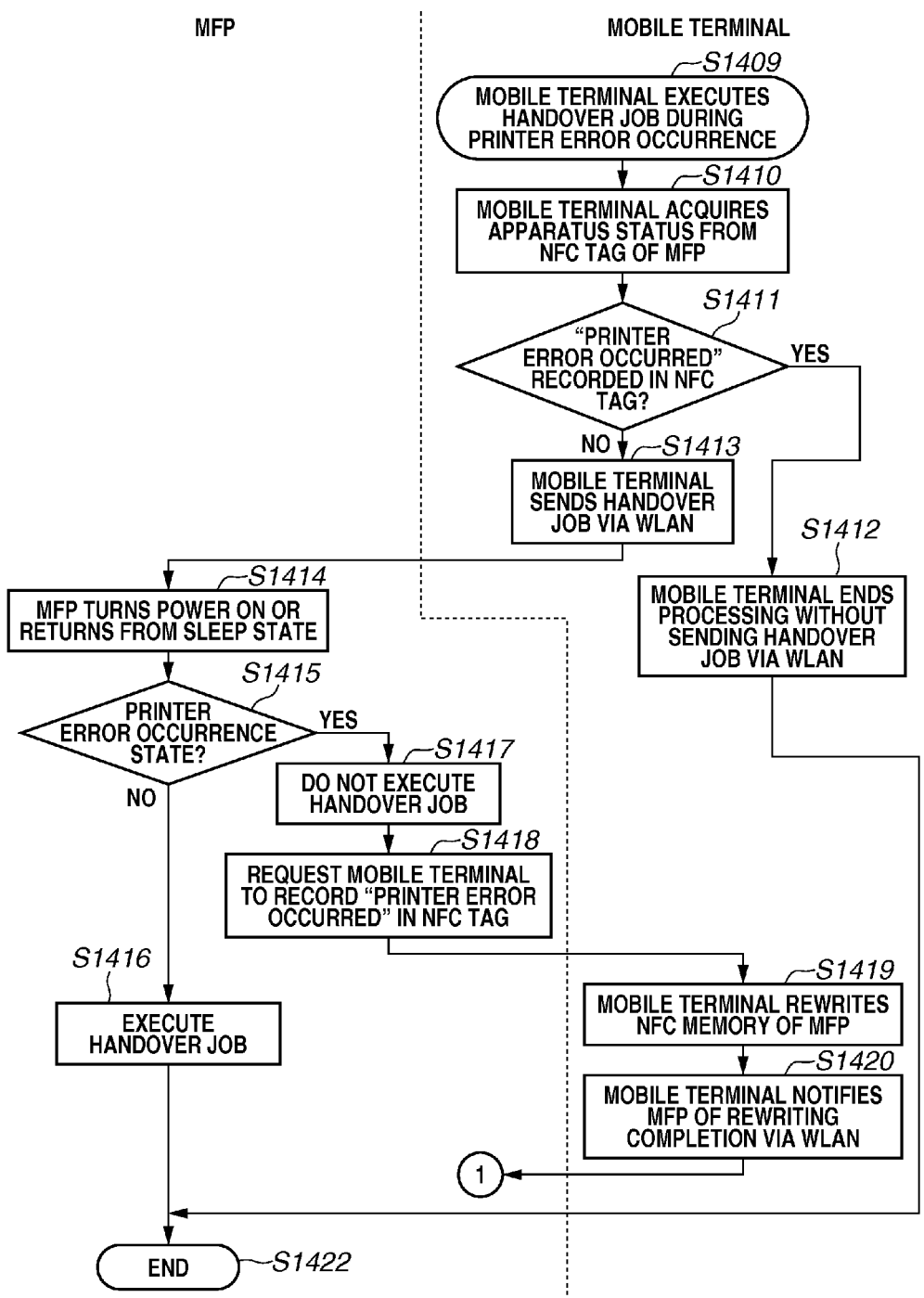

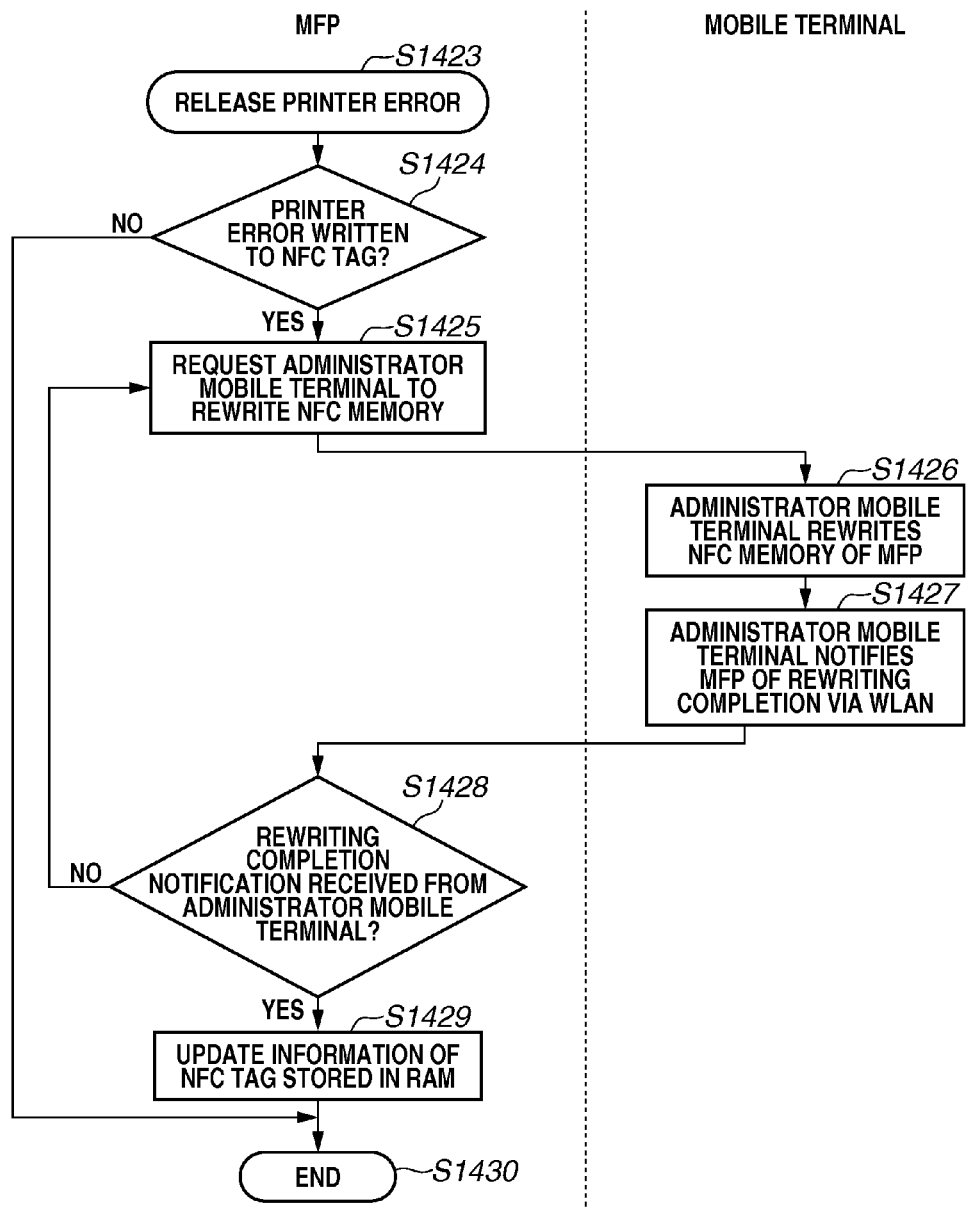

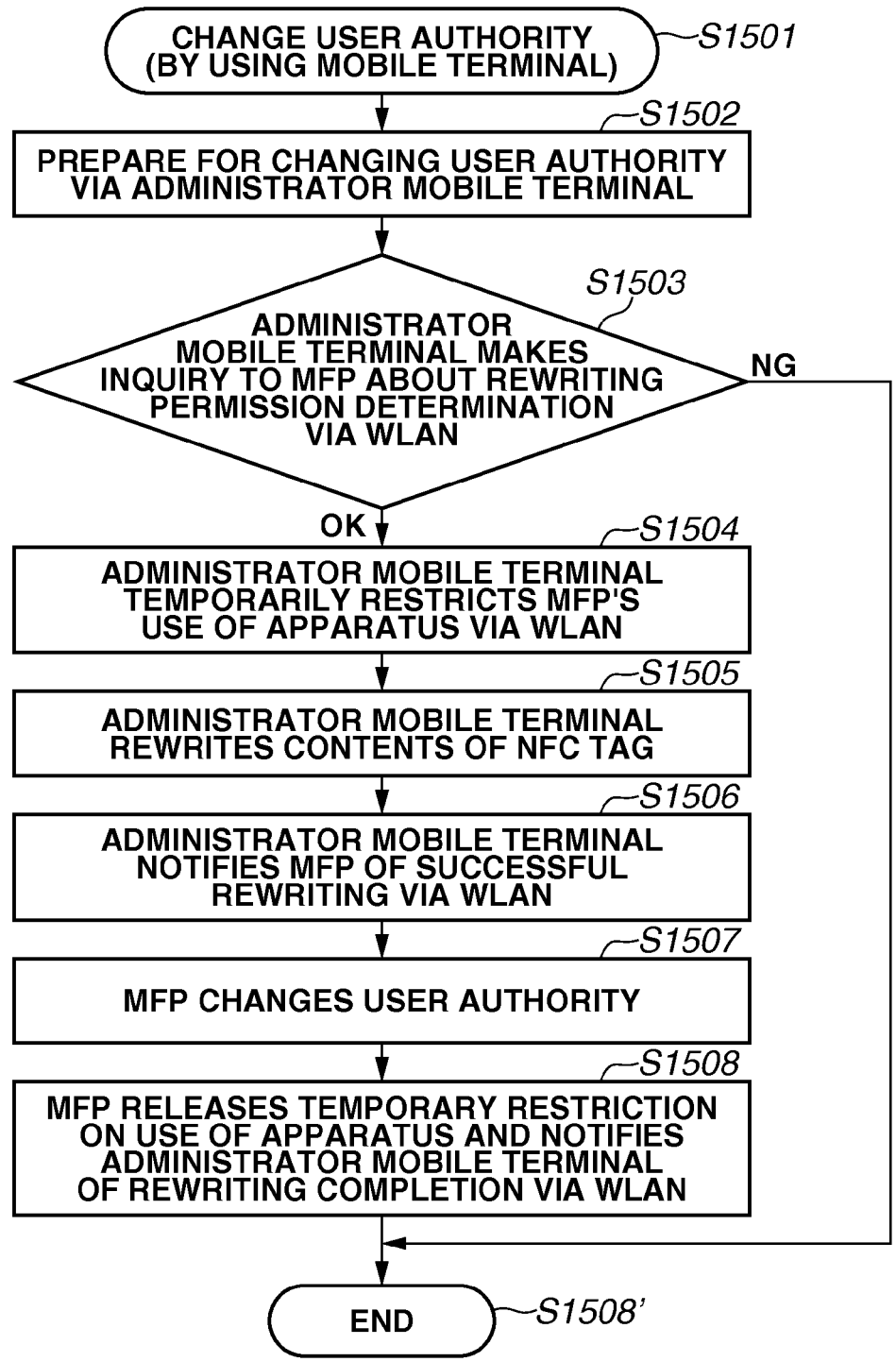

PRINTING SYSTEM, INFORMATION PROCESSING APPARATUS, CONTROL METHOD, AND STORAGE MEDIUM

BACKGROUND OF THE INVENTION

Field of the Invention

The present invention relates to a printing system, an information processing apparatus, a control method, and a program.

Description of the Related Art

An information processing apparatus is known to be provided with a short-distance wireless communication means for performing communication by using a non-contact integrated circuit (IC). For example, Japanese Patent Application Laid-Open No. 2013-186505 discusses a technique for writing a status of an information processing apparatus to a non-contact IC to efficiently perform power source control when a job is entered.

In a configuration discussed in Japanese Patent Application Laid-Open No. 2013-186505, a central processing unit (CPU) of the information processing apparatus is able to write data to a non-contact IC memory connected to the information processing apparatus. Therefore, when a power supply state or an error state of the information processing apparatus changes, the information processing apparatus is able to rewrite information in the non-contact IC memory. A non-contact IC rewritable from an information processing apparatus in this way is referred to as an active type non-contact IC. For example, if an error state occurs, the information processing apparatus writes the error state to the non-contact IC memory. When the error state is released, the information processing apparatus rewrites the error state to the relevant memory (Japanese Patent Application Laid-Open No. 2013-186505). However, for example, there is a seal type non-contact IC which is only stuck on an information processing apparatus. This type of non-contact IC is not electrically connected to the information processing apparatus, and therefore is referred to as a passive type non-contact IC. The passive type non-contact IC only responds to an access from outside. Therefore, when rewriting is required, another mobile terminal capable of performing rewriting needs to be used to write data to the passive type non-contact IC. The passive type is used in many cases since it is small in cost and space-saving. However, since the passive type non-contact IC only responds to an access from outside, it is not possible to immediately rewrite the contents of the non-contact IC even if the power supply state or the error state of the apparatus changes, as discussed in Japanese Patent Application Laid-Open No. 2013-186505. As a result, there is a possibility that an inconsistency arises between information stored in the apparatus and information stored in the non-contact IC.

SUMMARY OF THE INVENTION

According to an aspect of the present invention, a printing system includes a terminal apparatus and an information processing apparatus on which a non-contact IC tag can be mounted. The information processing apparatus includes a transmitting unit configured to, when a state of the information processing apparatus changes, transmit changed information which should be written to the non-contact IC tag to the terminal apparatus. The terminal apparatus includes a receiving unit configured to receive the changed information which should be written to the non-contact IC tag, a writing unit configured to perform processing for writing the changed information to the non-contact IC tag, and a notification unit configured to notify the information processing apparatus of a completion of the write processing.

Further features of the present invention will become apparent from the following description of exemplary embodiments with reference to the attached drawings.

BRIEF DESCRIPTION OF THE DRAWINGS

FIG. 2 is a front view illustrating a mobile terminal.

FIG. 4 is a block diagram schematically illustrating a configuration of the mobile terminal.

FIGS. 14A, 14B, and 14C are flowcharts illustrating processing performed when an error occurs in the MFP.

FIGS. 15A and 15B are flowcharts illustrating processing performed when a user authority is changed in the MFP.

DESCRIPTION OF THE EMBODIMENTS

The following describes exemplary embodiments of the present invention more specifically and in detail with reference to the accompanied drawings. In the present exemplary embodiments, a multifunction printer (hereinafter referred to as an MFP) having print, scan, facsimile, and other functions is used as an example of an information processing apparatus. Further, a smart phone having a large-screen user interface is used as an example of a mobile terminal. Further, Near Field Communication (NFC) will be described below as an example of proximity wireless communication. As an example of a passive type non-contact IC tag, an NFC tag is stuck on the MFP by using an adhesive seal. However, unless specifically noted, the scope of the present invention is not limited only to relative arrangement of constituent elements described in the exemplary embodiments. In the present specification, "recording" (also referred to as "printing") refers not only to forming meaningful information such as text and graphics but also to forming meaningless information. "Recording" further refers to forming an image, a design, or a pattern on a recording medium regardless of whether it can be visually perceived by the human, and to processing a recording medium. A "recording medium" refers not only to paper used with common recording apparatuses but also to a cloth, a plastic film, a metal plate, a glass, a ceramic, a wood, a leather, and other media which are able to receive ink.

A first exemplary embodiment will be described below. The following describes processing according to the present exemplary embodiment, in which a user changes a network setting (hereinafter referred to as a NW setting) on the operation panel of the MFP, and requests a mobile terminal to rewrite the NW setting stored in the memory of the NFC tag. Although, in an example according to the present exemplary embodiment to be described below, NFC is used as short-distance wireless communication, the communication method is not limited thereto. Any types of non-NFC communication standards based on the proximity wireless communication method, such as TransferJet (registered trademark), are applicable. In the present exemplary embodiment, NFC is used as a communication method which enables reliably identifying a communication partner although the transmission rate is comparatively low.

Figure 1:
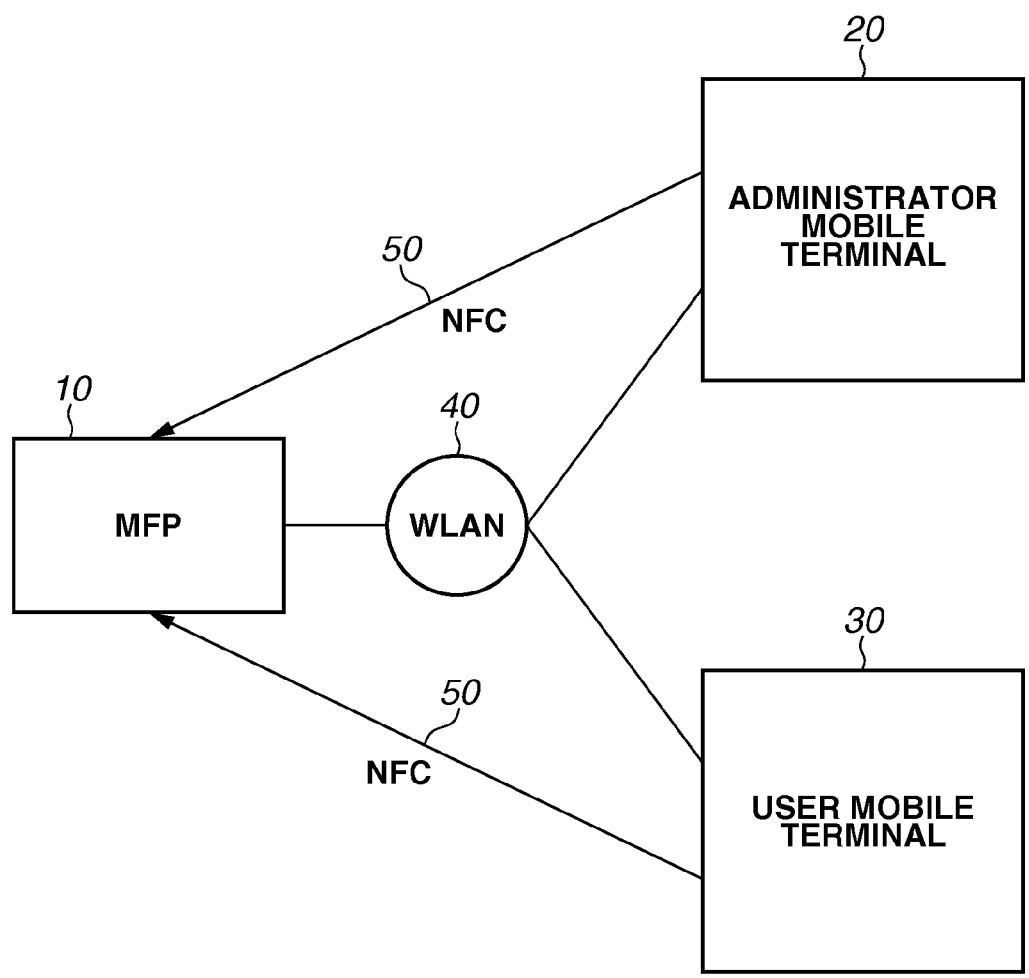
FIG. 1 is a block diagram illustrating an overall configuration of a network system.

FIG. 1 illustrates a configuration of an image forming system according to the present exemplary embodiment. The image forming system is a printing system including an administrator mobile terminal 20, a user mobile terminal 30, and an MFP 10 which are mutually connected centering on a wireless local area network (WLAN) 40 so that they can communicate with each other. Further, the mobile terminals 20 and 30 are able to communicate with the MFP 10 via NFC 50. Mobile terminals include not only smart phones but also personal information terminals such as personal digital assistants (PDAs), mobile phones, and digital cameras. Mobile terminals are not limited to thereto, and may be any types of terminal apparatuses capable of performing both short-distance wireless communication, such as NFC, and general wireless communication, such as WLAN. Not only WLAN but also wired communication is applicable to the present invention. The MFP 10 is provided with a function of optically reading a document placed on a document plate, a print function using a printing unit such as an ink-jet printer, and a copy function that combines the read and print functions. The MFP 10 may be provided with facsimile and telephone functions. The printing unit may be other systems, such as a laser beam printer.

FIG. 2 is a generalized view illustrating an administrator mobile terminal 20 and a user mobile terminal 30. Each of these mobile terminals is referred to as a mobile terminal 200. In the present exemplary embodiment, a smart phone is used as the mobile terminal 200. A smart phone refers to a multifunction mobile phone terminal having camera, net browser, and mail functions in addition to a mobile phone function. An NFC unit 201 is a portion of the mobile terminal 200 for performing communication via NFC. When the user actually brings the NFC unit 201 close to about 10 cm or less from the NFC unit 201 of a communication partner and then touches it (or bring the NFC unit 201 to the proximity of the communication partner), communication between the two mobile terminals 200 is enabled. A WLAN unit 202 is a portion of the mobile terminal 200 used in performing communication via WLAN. A display unit 203 is a display having a liquid crystal display (LCD) mechanism. An operation unit 204 includes a touch-panel operation mechanism for detecting depression of a button by the user. As a typical operation method, when the display unit 203 displays software keys and the user presses a button on the operation unit 204, an event corresponding to the pressed button is issued. A power key 205 is used to turn power on and off.

Figure 3A:
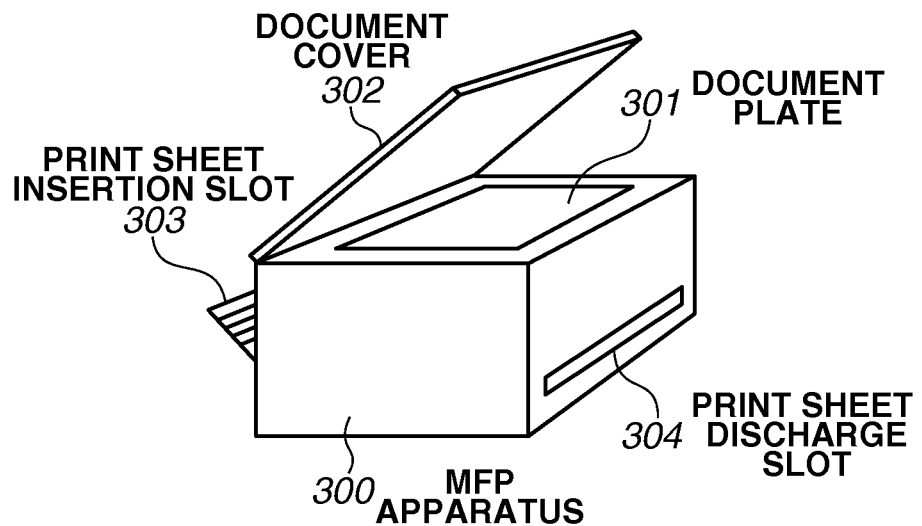
FIGS. 3A and 3B are outer appearance perspective views schematically illustrating a configuration of a multifunction printer (MFP).
Figure 3B:
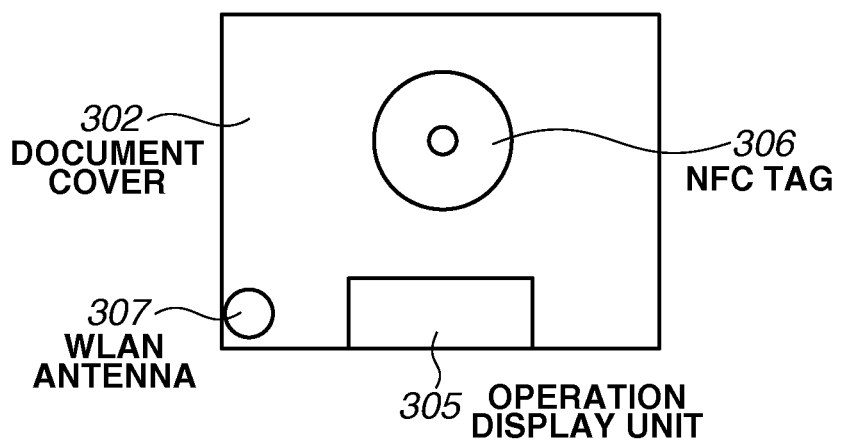

FIGS. 3A and 3B are generalized views illustrating the MFP 10 which is referred to as an MFP 300. A document plate 301 is a transparent glass-like plate on which a document is placed to be read by a scanner. A document cover 302 is used to prevent reading light from leaking outside while the scanner is reading a document. A print sheet insertion slot 303 is used to set sheets of various sizes. Sheets set at the print sheet insertion slot 303 are conveyed one by one toward the printing unit. When desired printing is completed, each sheet is discharged from a print sheet discharge slot 304. An operation display unit 305 and an NFC tag 306 are disposed on the top of the document cover 302. The operation display unit 305 is provided with hardware keys, such as a cross key and a start key, and a LCD display unit. The NFC tag 306 is a small chip for performing proximity wireless communication. Actually, the user brings the mobile terminal 200 to the proximity of the NFC tag 306 of the MFP 300. The effective proximity (touch) range is about 10 cm from the NFC tag 306. The NFC tag 306 will be described in detail below with reference to FIG. 7. A WLAN antenna 307 includes an antenna for performing communication via WLAN.

FIG. 4 is a block diagram illustrating the mobile terminal 200. The mobile terminal 200 includes a main board 401 for performing main control of the apparatus, a WLAN unit 420 for performing WLAN communication, an NFC unit 421 for performing NFC communication, and a Bluetooth (BT) unit 422 for performing Bluetooth (registered trademark) communication. A CPU 402 of the main board 401 serves as a system control unit for totally controlling the entire mobile terminal 200. A read only memory (ROM) 403 stores control programs and built-in operating system (OS) programs which are executed by the CPU 402. In the present exemplary embodiment, each control program stored in the ROM 403 executes software control, such as scheduling and task switching, under the management of the built-in OS stored in the ROM 403. The CPU 402 reads control programs stored in the ROM 403 into a random access memory (RAM) 404 and then executes the programs to implement operations of flowcharts (described below) performed by the mobile terminal 200.

The RAM 404 composed of a static RAM (SRAM) stores program control variables, user-registered setting values, and management data of the mobile terminal 200. Various working buffer regions are also provided in the RAM 404. An image memory 405 composed of a dynamic RAM (DRAM) temporarily stores image data received via the communication unit and image data read from a data storage unit 412 to allow the image data to be processed by the CPU 402.

A nonvolatile memory 415 composed of a flash memory stores data which needs to be retained even after power is turned off. Such data includes telephone directory data, NW settings, user information, and apparatus status information.

The memory configuration of the mobile terminal 200 is not limited thereto. For example, the image memory 405 and the RAM 404 may be shared, and data may be backed up in the data storage unit 412. Although a DRAM is used in the present exemplary embodiment, a hard disk or a nonvolatile memory may be used.

A data conversion unit 406 analyses a page description language (PDL), and performs data conversion such as color conversion and image conversion. A telephone unit 407 controls a telephone line and processes audio data output and input via a speaker unit 413 to achieve telephone communication. An operation unit 408 controls signals of the operation unit 204 described with reference to FIG. 2. A global positioning system (GPS) 409 acquires the current latitude and longitude information of the mobile terminal 200. A display unit 410 electronically controls the display contents of the display unit 203 described with reference to FIG. 2 to receive various input operations and display operation and other statuses of the MFP 300.

A camera unit 411 has a function of electronically recording and coding an image input via a lens. An image captured by the camera unit 411 is stored in the data storage unit 412. The speaker unit 413 implements a function of inputting and outputting sound for the telephone function and other functions such as an alarm notification function. A power source 414 includes and controls a portable battery. Power states include, for example, a battery exhausted state when there is no remaining battery capacity, a power off state, a normal operating (power on) state, and a power-saving state in which the mobile terminal 200 is operating in a power-saving mode.

The mobile terminal 200 is capable of performing wireless communication conforming to three different standards: WLAN, NFC, and BlueTooth (registered trademark), thus achieving data communication with other devices such as the MFP 300. When performing data communication, the mobile terminal 200 converts data into a packet format and then performs packet transmission to other devices. Meanwhile, the mobile terminal 200 receives packet data from other external devices, coverts the packet data into processable data, and outputs the converted data to the CPU 402. For example, the mobile terminal 200 first receives connection information for WLAN and Bluetooth (registered trademark) from the MFP 300 via NFC. Upon completion of NFC communication, the mobile terminal 200 switches to a comparatively high speed communication method such as WLAN and Bluetooth (registered trademark) and then transmits image data. This processing is referred to as handover. The WLAN unit 420, the NFC unit 421, and the BT unit 422 are connected via bus cables 416, 417, and 418, respectively. The WLAN unit 420, the NFC unit 421, and the BT unit 422 achieve wireless communication conforming to each telecommunication standard. The NFC unit 421 will be described below with reference to FIG. 6. The above-described constituent elements 402 to 415 and 420 to 422 are mutually connected via a system bus 419, and controlled by the CPU 402.

Figure 5:
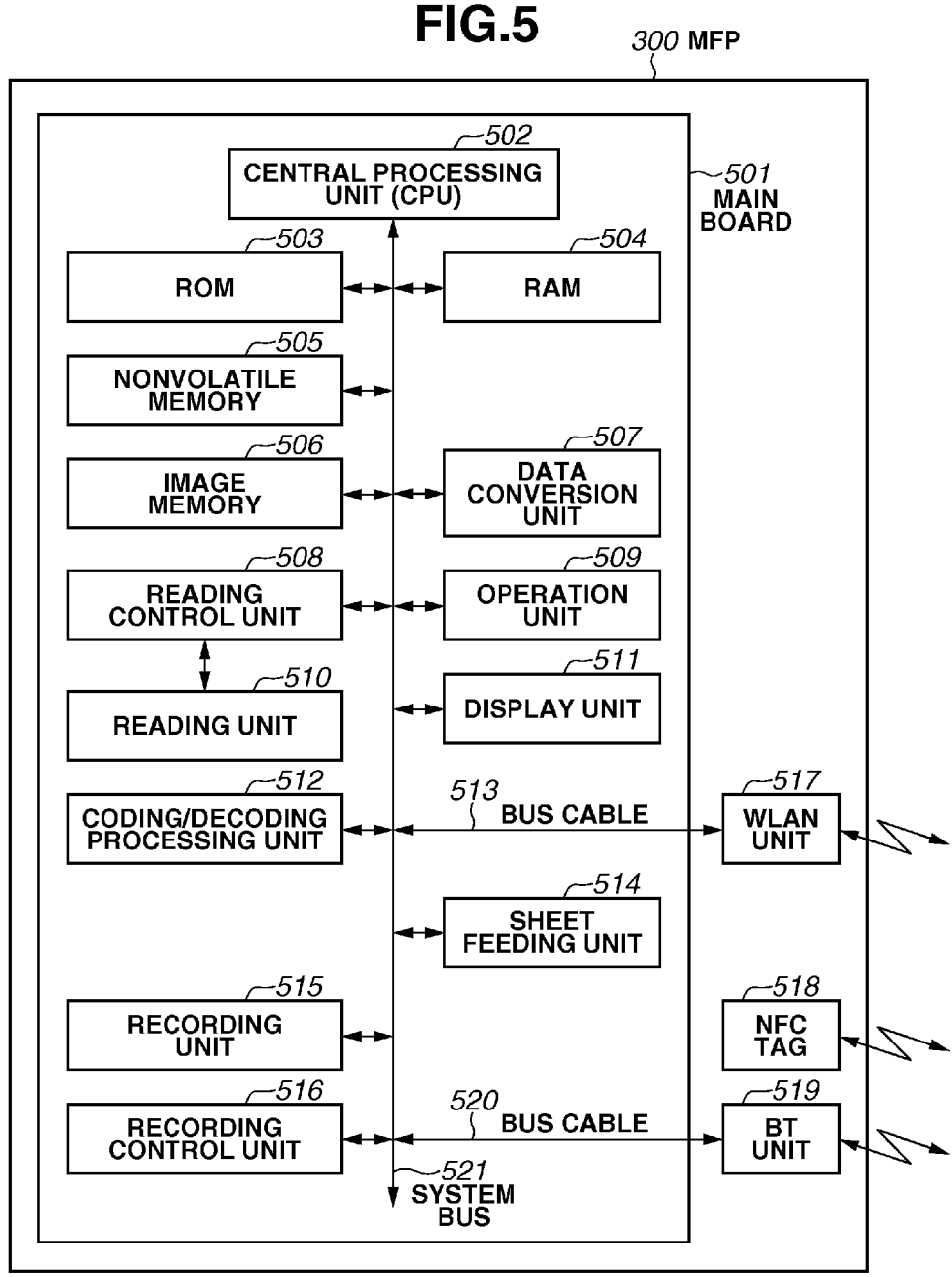
FIG. 5 is a block diagram schematically illustrating a configuration of the MFP.

FIG. 5 is a block diagram schematically illustrating a configuration of the MFP 300. The MFP 300 includes a main board 501 for performing main control of the apparatus, a WLAN unit 517 for performing WLAN communication, an NFC tag 518 for performing NFC communication, and a BT unit 519 for performing Bluetooth (registered trademark) communication.

A CPU 502 of the main board 501 is a system control unit, and comprehensively controls the entire MFP 300. A read only memory (ROM) 503 stores control programs and built-in operating system (OS) programs which are executed by the CPU 502. In the present exemplary embodiment, each control program stored in the ROM 503 performs software control, such as scheduling and task switching, under the management of the built-in OS stored in the ROM 503. The CPU 502 reads control programs stored in the ROM 503 into a RAM 504 and then executes the programs to implement operations of flowcharts (described below) for the MFP 300.

The RAM 504 composed of a static RAM (SRAM) stores program control variables, user-registered setting values, and management data of the MFP 300. Various working buffer regions are also provided in the RAM 504. A nonvolatile memory 505 composed of a flash memory stores data which needs to be retained even after power is turned off. Such data includes network connection information and user data. The nonvolatile memory 505 will be described in detail below with reference to FIG. 8. The image memory 506 composed of a dynamic RAM (DRAM) stores image data received via each communication unit and image data processed by a coding/decoding processing unit 512. Similar to the memory configuration of the mobile terminal 200, the memory configuration of the MFP 300 is not limited thereto. For example, the image memory 506 and the RAM 504 may be shared. Although a DRAM is used as the image memory 506 in the present exemplary embodiment, a hard disk or a nonvolatile memory may be used. A data conversion unit 507 analyzes a page description language (PDL), and performs data conversion, for example, from image data to print data.

A reading unit 510 optically reads a document by using a contact image sensor (CIS). The reading control unit 508 performs, via an image processing control unit (not illustrated), various types of image processing, such as binarization processing and halftone processing, on electrical image data converted from an image signal. Then, the reading control unit 508 outputs high-resolution image data. The operation unit 509 and the display unit 511 include various setting keys used by the user to perform operations, and a LCD for display data. The coding/decoding processing unit 512 performs coding/decoding processing and scaling processing on image data (JPEG, PNG, etc.) to be processed by the MFP 300.

A sheet feeding unit 514 stores print sheets and feeds print sheets under the control of a recording control unit 516. To store a plurality of types of print sheets, the sheet feeding unit 514 may be provided with sheet feeding units capable of storing sheets having a plurality of sizes. The recording control unit 516 performs control to select a sheet feeding unit from which sheets are to be fed.

The recording control unit 516 performs, via the image processing control unit (not illustrated), various types of image processing such as smoothing processing, recording density correction processing, and color correction processing on printing target image data to convert the image data into high-resolution image data. Then, the recording control unit 516 outputs the image data to a recording unit 515. The recording control unit 516 is also able to periodically read information of the printing unit, and update information stored in the RAM 504. For example, the recording control unit 516 updates the remaining quantity of an ink tank and nozzle conditions of a recording head. Similar to the mobile terminal 200, the MFP 300 is also provided with three different configurations for wireless communication. However, the NFC unit 421 of the mobile terminal 200 is the active type, and is able to rewrite the contents of the NFC memory 605 or the contents of the NFC tag of other devices. On the other hand, the NFC tag 518 is the passive type and is not connected with a system bus 521. Therefore, the NFC tag 518 is not able to communicate with the CPU 502. The NFC tag 518 is the passive type and therefore is able to communicate with other devices only by responding to a request from the active type, and is not able to perform communication in an active way.

The above-described constituent elements 502 to 517 are mutually connected via the system bus 521, and controlled by the CPU 502.

Figure 6:
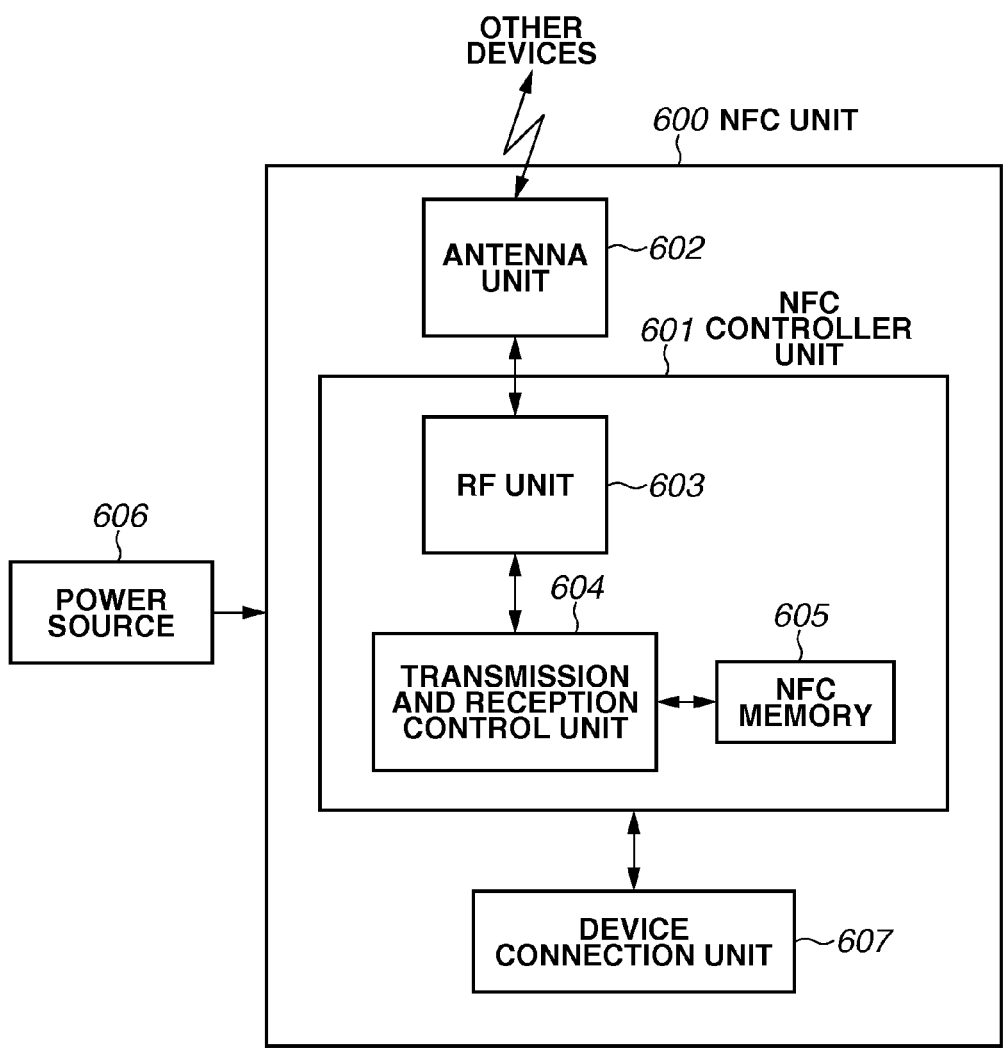
FIG. 6 is a block diagram illustrating a detailed configuration of a Near Field Communication (NFC) unit of the mobile terminal.

FIG. 6 illustrates a detailed configuration of an NFC unit used in the NFC unit 421. In the following descriptions, the NFC unit is generalized as an NFC unit 600. NFC communication will be described below. In proximity wireless communication by using the NFC unit 600, an apparatus called an initiator first outputs a radio frequency (RF) field to start communication, and an apparatus called a target responds to an instruction issued by the initiator to communicate with the initiator.

The passive mode and the active mode will be described below. The NFC unit 600 has two different communication modes: the passive mode and the active mode. In the passive mode, the target responds to an instruction of the initiator through load modulation. Therefore, the target does not need to be supplied with power. On the other hand, in the active mode, the target responds to an instruction of the initiator by using an RF field generated by the target itself. Therefore, the target needs to be supplied with power. The active mode has a feature of providing higher communication speed than the passive mode.

The following describes a configuration of the NFC unit 600 with reference to FIG. 6. The NFC unit 600 includes an NFC controller unit 601, an antenna unit 602, an RF unit 603, a transmission and reception control unit 604, an NFC memory 605, a power source 606, and a device connection unit 607. The antenna unit 602 receives and transmits a radio wave from and to other NFC devices. The RF unit 603 has a function of coding an analog signal into a digital signal and decoding a digital signal into an analog signal. The RF unit 603 including a synthesizer identifies band and channel frequencies, and performs band and channel control based on frequency assignment data. The transmission and reception control unit 604 performs control related to transmission and reception, such as assembly and disassembly of transmission and reception frames, addition and detection of a preamble, and frame identification. The transmission and reception control unit 604 also controls the NFC memory 605 to enable writing and reading various data and programs to/from the NFC memory 605. In the NFC memory 605, an NFC control password can be set to prevent information in the NFC memory 605 from being rewritten by unspecified users. When performing communication without the NFC control password, the NFC memory 605 operates in the read only mode. When performing communication with the NFC control password, information can be written and read to/from the NFC memory 605. The NFC control password can be set at any time. Further, the NFC control password can be written but cannot be read. Therefore, it is possible to achieve control in which only a user who knows the NFC control password is able to rewrite the password.

When the NFC unit 600 operates in the active mode, the NFC unit 600 receives power supplied via the power source 606. The NFC controller unit 601 communicates with the main unit side via the device connection unit 607, or other NFC devices in a communicable range by using a carrier transmitted and received via the antenna unit 602. A carrier refers to a digital signal generated from the above-described radio wave. When the NFC unit 600 operates in the passive mode, the NFC unit 600 receives a carrier from other NFC devices via the antenna unit 602. Then, the NFC unit 600 receives power supplied from other NFC devices through electromagnetic induction, and performs communication with the relevant NFC devices through carrier modulation to transmit and receive data. In such a configuration, even when the MFP 300 is in the power-saving state or the power off state, the mobile terminals 200 and the MFP 300 are able to mutually transmit and receive data in the NFC memory 605.

Figure 7:
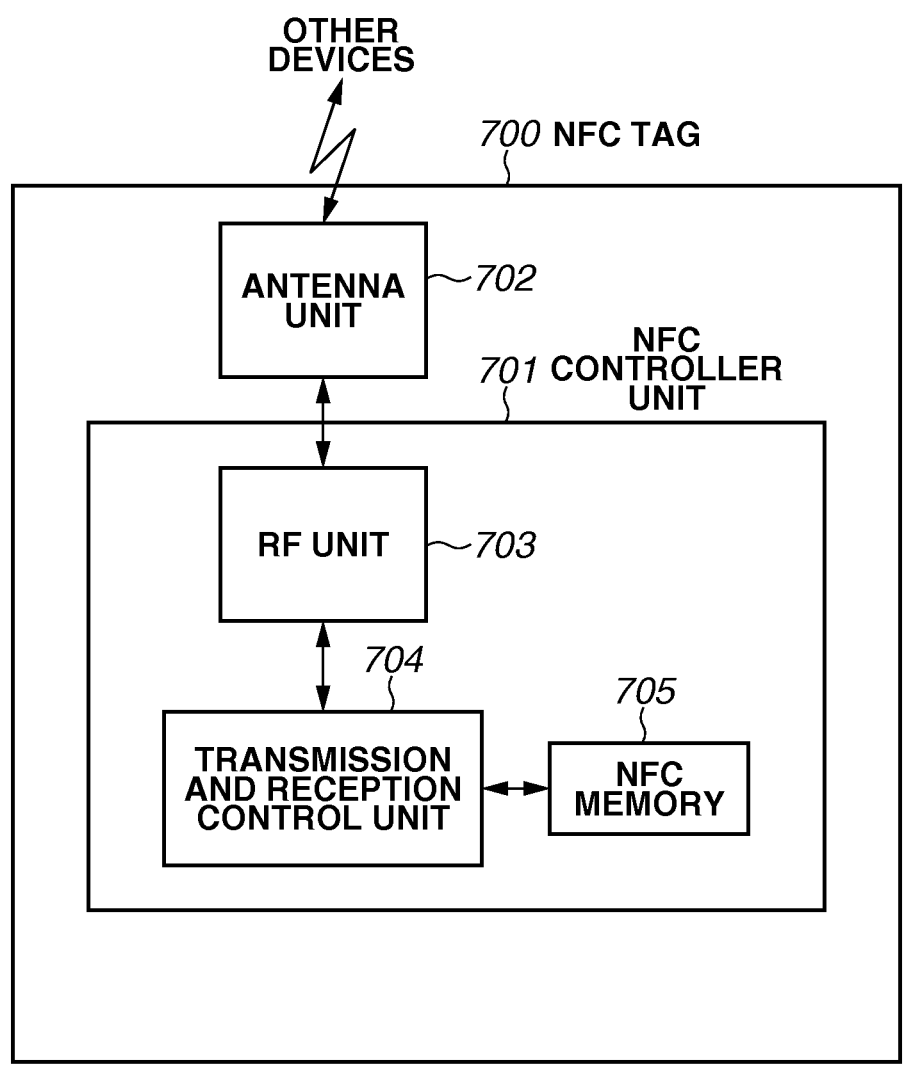
FIG. 7 is a block diagram illustrating a detailed configuration of an NFC tag of the MFP.

FIG. 7 illustrates a detailed configuration of an NFC tag used as the NFC tag 518. In the following descriptions, the NFC tag is generalized as an NFC tag 700. The NFC tag 700 differs from the NFC unit 600 in that it does not include the power source 606 and the device connection unit 607, therefore operates only in the passive mode. Since the NFC tag 700 is not able to exchange information with the CPU 502 of the MFP 300, the CPU 502 of the MFP 300 is able to recognize neither that the mobile terminal 200 has accessed the NFC tag 700 nor that an NFC memory 705 of the NFC tag 700 has been rewritten. Therefore, to change the contents of the NFC memory 705, a device capable of communicating with the NFC tag 700 in the active mode needs to be used. The description of the passive mode is similar to that described above with reference to FIG. 6, and thus will be omitted.

For supplemental descriptions, an active tag (active type non-contact IC tag) refers to the configuration illustrated in FIG. 6. Since the active tag is connected with each block on the main board 401 via the system bus 419, the CPU 402 is able to read and rewrite the contents of the NFC memory 605 of the active tag.

A passive tag (passive type non-contact IC tag) of the NFC tag 700 refers to the configuration illustrated in FIG. 7. Since the passive tag is not connected with each block on the main board 501 via the system bus 521 or an electronic circuit, the CPU 502 is not able to read or rewrite information stored in the passive tag. This means that the CPU 502 is not able to know the contents stored in the memory 705 of the NFC tag 700. When a reader writer apparatus is brought close to the passive tag, a dielectric current is generated. The use of the dielectric power enables communication between the passive tag and the reader writer apparatus. The NFC unit 421 is an active tag, and the NFC tag 518 is a passive tag.

Figure 8:
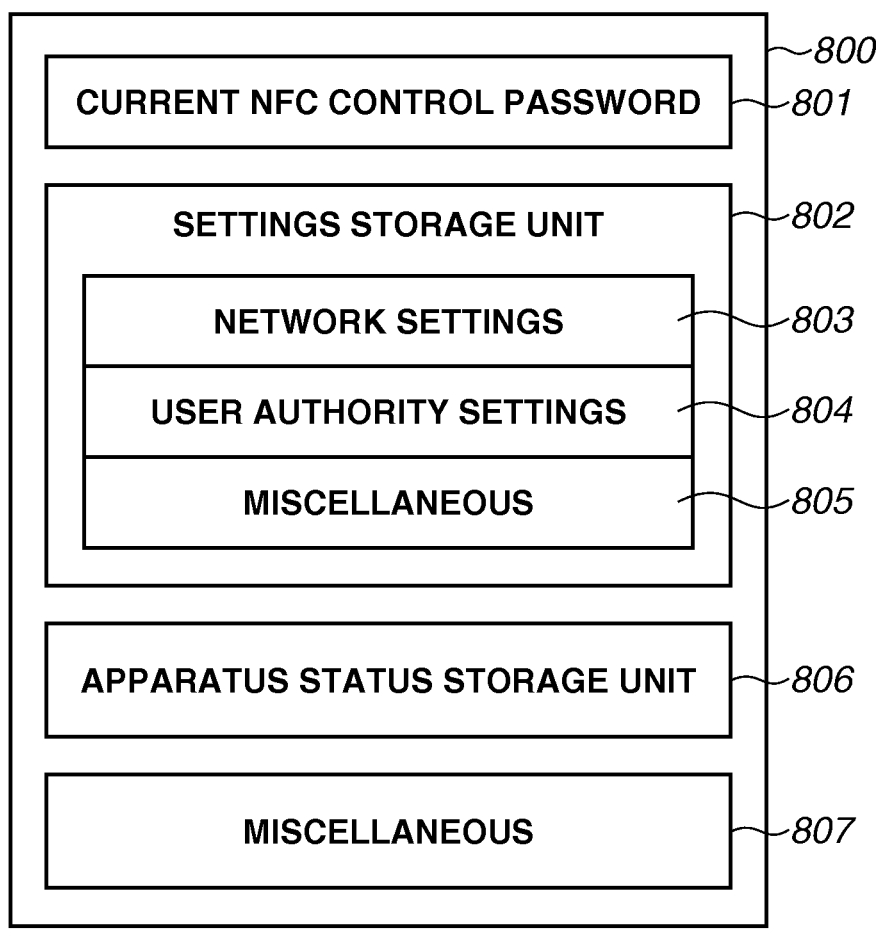
FIG. 8 is a block diagram illustrating a configuration of a flash memory of the MFP.

FIG. 8 illustrates a detailed configuration of the nonvolatile memory 505 of the MFP 300. As described above, the CPU 502 of the MFP 300 is not able to know the contents stored in the NFC memory 705 of the NFC tag 700 (passive tag). Therefore, when the contents of the NFC memory 705 are rewritten by other terminals, such as the mobile terminal 200, it is necessary to reliably notify the MFP 300 that the contents of the NFC memory 705 have been rewritten and store the rewritten contents in the nonvolatile memory 505 to maintain the consistency with the contents of the NFC memory 705. A settings storage unit 802 stores information currently stored in the NFC memory 705. Each time the MFP 300 receives a notice that the contents of the NFC memory 705 have been rewritten by the mobile terminal 200, the settings storage unit 802 also changes the contents to be stored. The nonvolatile memory 505 stores a current NFC control password 801. When the MFP 300 requests the mobile terminal 200 to rewrite the NFC tag 700, the MFP 300 also transmits the NFC control password 801 to the mobile terminal 200. Network settings 803 stores information necessary for the mobile terminal 200 to communicate with the MFP 300 via handover. As an example of information for performing communication, information for WLAN connection includes a service set identifier (SSID), encryption information, a media access control (MAC) address, etc. Information for Bluetooth (registered trademark) connection includes a Bluetooth device (BD) address, etc. In addition, a uniquely set printer name may also be used.

Handover will be described below. Handover refers to a series of processing which includes performing the pairing of the mobile terminal 200 and the MFP 300 by using short-distance wireless communication such as comparatively low speed NFC, switching to comparatively high speed wireless communication such as WLAN, and then performing print processing. NFC has an advantage that apparatus identification can be intuitively and uniquely performed since the pairing of apparatuses is performed when they are brought to proximity to each other. On the other hand, WLAN provides high transmission speed but may have the difficulty in making settings for apparatus identification. Switching the communication by taking both advantages of the above-described communication methods in this way is referred to as handover. A more specific example will be described below. The user selects a printing target photograph stored in the mobile terminal 200, and brings the NFC unit 201 of the mobile terminal 200 to the proximity of the NFC tag 306 of the MFP 300. Then, the mobile terminal 200 reads the network settings 803 via NFC communication, recognizes WLAN connection information, switches the connection method to WLAN based on the WLAN connection information, and then performs print processing. More specifically, the mobile terminal 200 transmits the selected photograph to the MFP 300 via WLAN as print data. This enables the user to intuitively select a target MFP for printing and an image file having a large data size to be transmitted at high speed.

User authority settings 804 store the user authority to use the MFP 300 via handover. An apparatus status storage unit 806 stores the current apparatus status of the MFP 300. The apparatus status storage unit 806 stores, for example, information indicating that printing has not been performed due to a paper jam occurring in the sheet feeding unit 514 and information indicating that the MFP 300 is out of ink.

Figure 9:
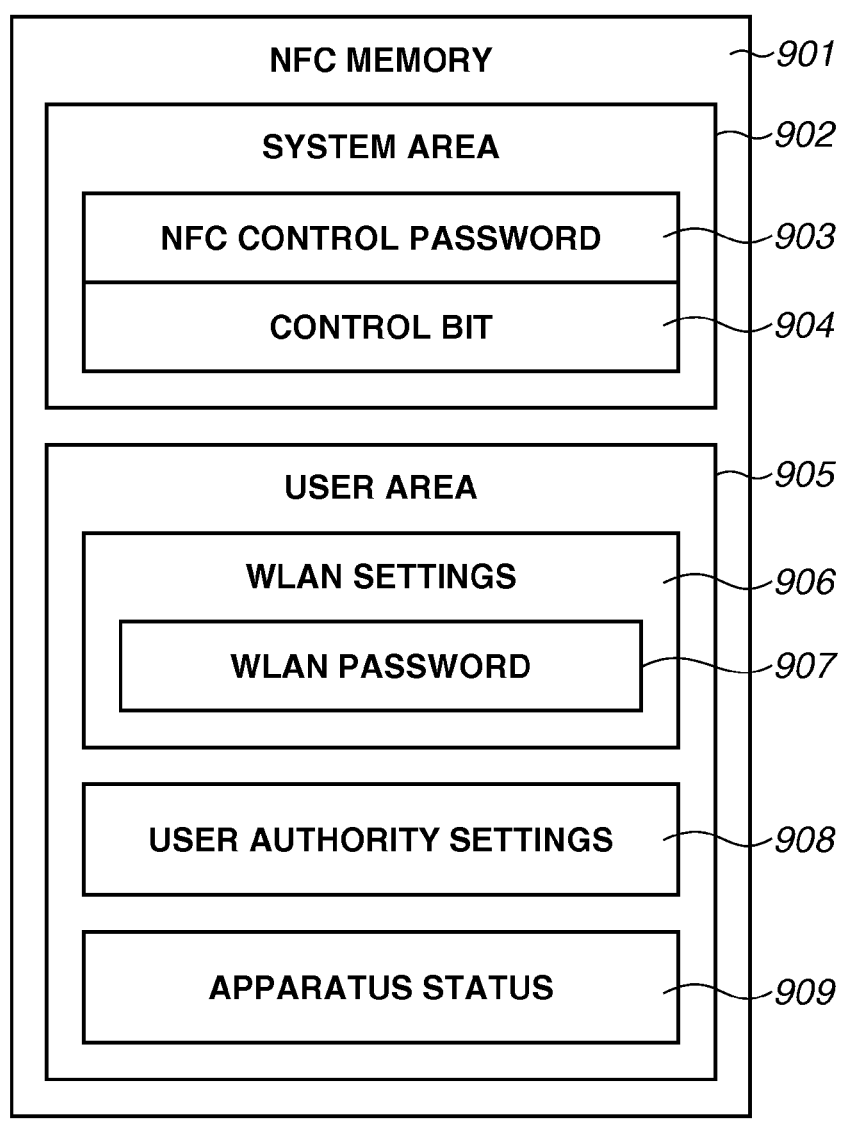
FIG. 9 is a block diagram illustrating a configuration of an NFC memory of the NFC tag of the MFP.

FIG. 9 illustrates a detailed configuration of data stored in the NFC memory 705 of the NFC tag 700. An entire NFC memory 901 is divided into a system area 902 and a user area 905. The system area 902 is an area for controlling the NFC memory 901. An NFC control password 903 stores a password for permitting the writing to the user area 905. The relevant password is compared with one transmitted from the mobile terminal 200. When these passwords are matched, the writing to the user area 905 is permitted. Password processing will be described in detail below with reference to FIG. 10. The user area 905 is able to store user-defined data. In the present exemplary embodiment, the user area 905 stores WLAN settings 906, a WLAN password 907, user authority settings 908, and an apparatus status 909 for performing handover. The user authority settings 908 store a list of users who are able to perform handover. The mobile terminal 200 reads the user authority settings 908 and determines whether to perform handover. The apparatus status 909 stores the current apparatus status of the MFP 300. When the mobile terminal 200 acquires the apparatus status 909 and determines that a job performing handover has a problem, the mobile terminal 200 determines not to perform handover.

Figure 10:
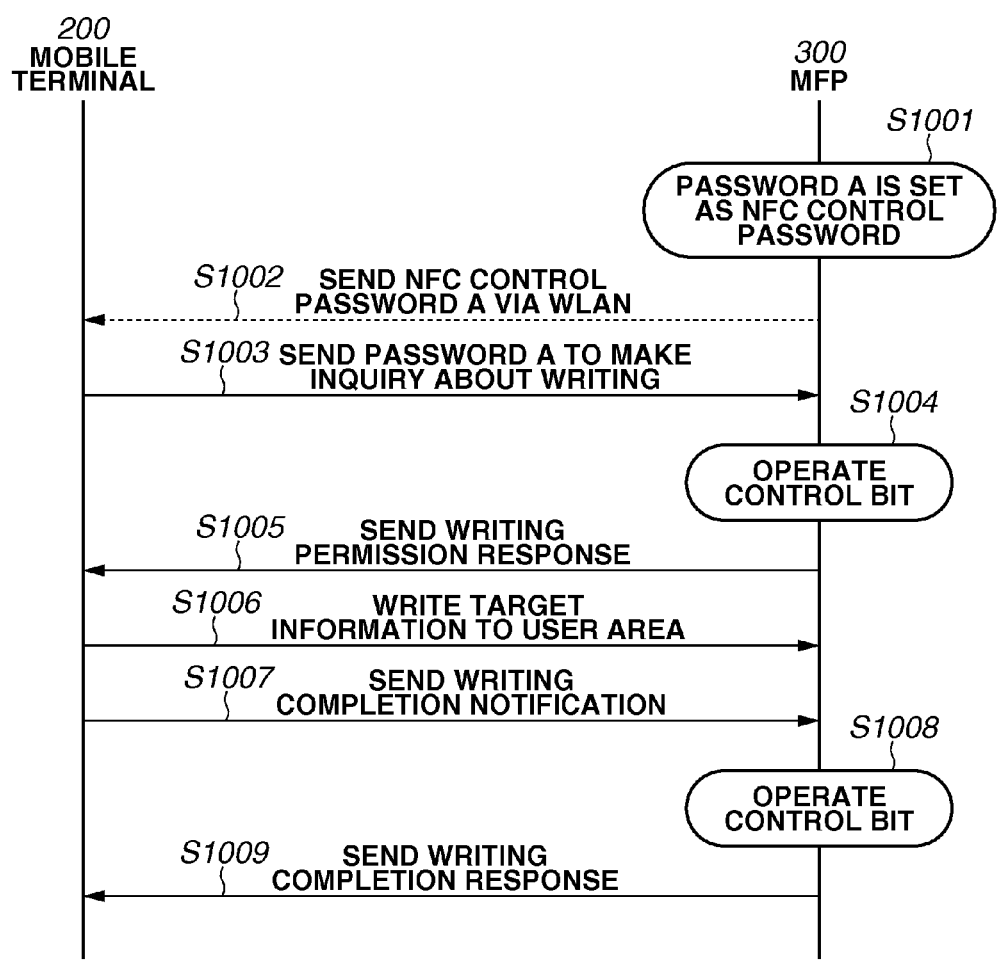
FIG. 10 illustrates a sequence in which the mobile terminal writes data to the NFC tag of the MFP.

FIG. 10 illustrates a sequence in which the mobile terminal 200 writes data to the user area 905 in the NFC memory 705 of the NFC tag 700 stuck on the MFP 300.

In step S1001, a password A is set as the NFC control password 903. When an event involving the rewriting of data in the NFC memory 705 occurs, in step S1002, the MFP 300 transmits the NFC control password A to the mobile terminal 200 via WLAN to request the mobile terminal 200 to write the NFC control password A. In step S1003, by using the password A, the mobile terminal 200 makes an inquiry to the MFP 300 about whether writing is possible. The MFP 300 compares the password A received from the mobile terminal 200 in step S1003 with the NFC control password 903. When they are matched, then in step S1004, the MFP 300 changes the control bit 904 from "0" to "1." In step S1005, the MFP 300 transmits a writing permission response to the mobile terminal 200. After transmitting the writing permission response, the MFP 300 further transmits writing target information to the mobile terminal 200. In step S1006, the mobile terminal 200 writes the received writing target information to the user area 905. In step S1007, the mobile terminal 200 transmits a writing completion notification to the MFP 300. In step S1008, the MFP 300 changes the control bit 904 from "1" back to "0." In step S1009, the MFP 300 transmits a writing completion response to the mobile terminal 200. Through the execution of the sequence illustrated in FIG. 10, the MFP 300 can request the mobile terminal 200 to update the contents of the NFC memory 705 as required and to prevent writing from an unintended mobile terminal.

Figure 11:
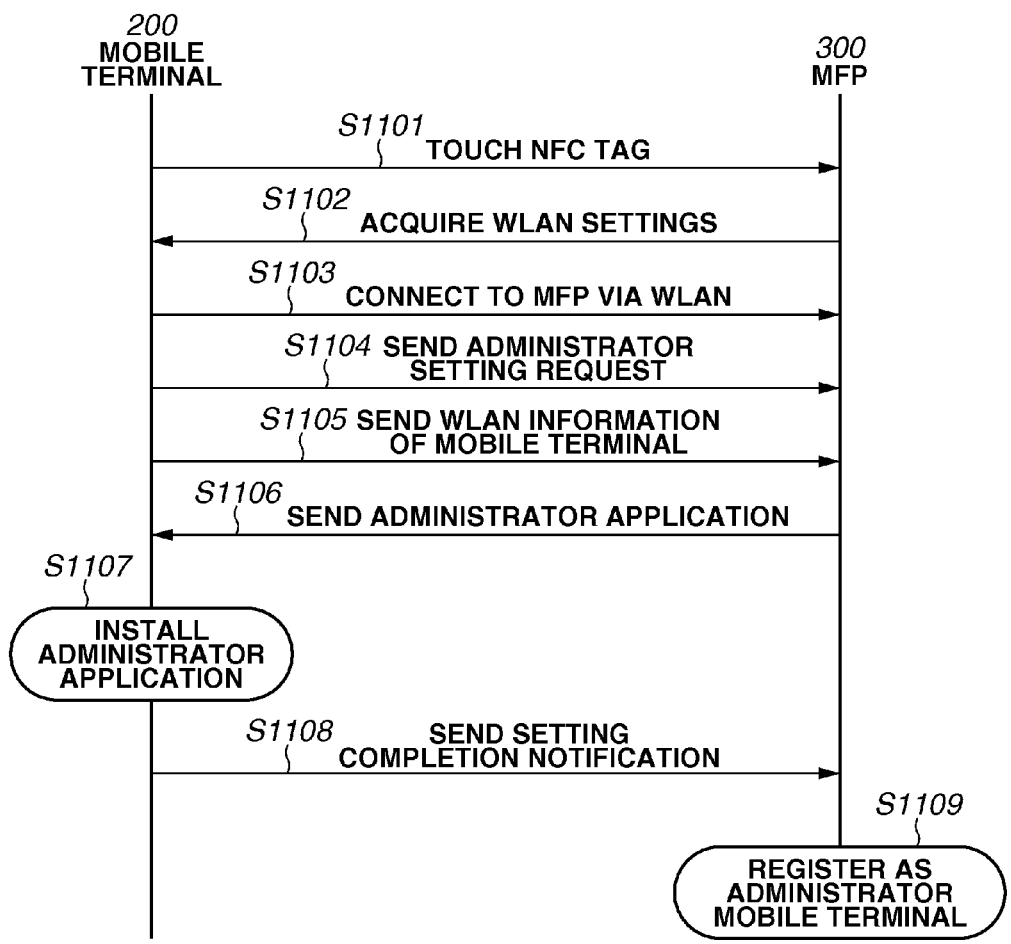
FIG. 11 illustrates a sequence for registering an administrator mobile terminal.

FIG. 11 illustrates a sequence for registering an administrator mobile terminal 20. A mobile terminal 200 requested by the MFP 300 to write data to the NFC memory 705 is referred to as an administrator mobile terminal 20. The user registers the administrator mobile terminal 20 in advance of the following procedures. In step S1101, a user who wants to register the mobile terminal 200 as an administrator mobile terminal 20 brings it to the proximity of the NFC tag 700. In step S1102, the mobile terminal 200 acquires the WLAN settings 906. In step S1103, by using the acquired WLAN settings 906, the mobile terminal 200 connects to the MFP 300 via WLAN. When connection is successfully completed, in step S1104, the mobile terminal 200 transmits an administrator setting request to the MFP 300. In step S1105, the mobile terminal 200 transmits WLAN information to the MFP 300 to allow the MFP 300 to connect to the mobile terminal 200 via WLAN. In step S1106, the MFP 300 transmits an administrator application to the mobile terminal 200. In step S1107, the mobile terminal 200 installs the administrator application. The installation of an administrator application may be performed when the mobile terminal 200 receives the entity of the application, or performed by using information indicating the location where the application exists. An administrator application is provided with functions of transmitting and changing an NFC control password, and a function of writing predetermined information to the user area 905. In step S1108, the mobile terminal 200 transmits a setting completion notification to the MFP 300. In step S1109, the MFP 300 registers the mobile terminal 200 as the administrator mobile terminal 20. Through the execution of the sequence illustrated in FIG. 11, the MFP 300 is able to register the administrator mobile terminal 20.

Figure 12:
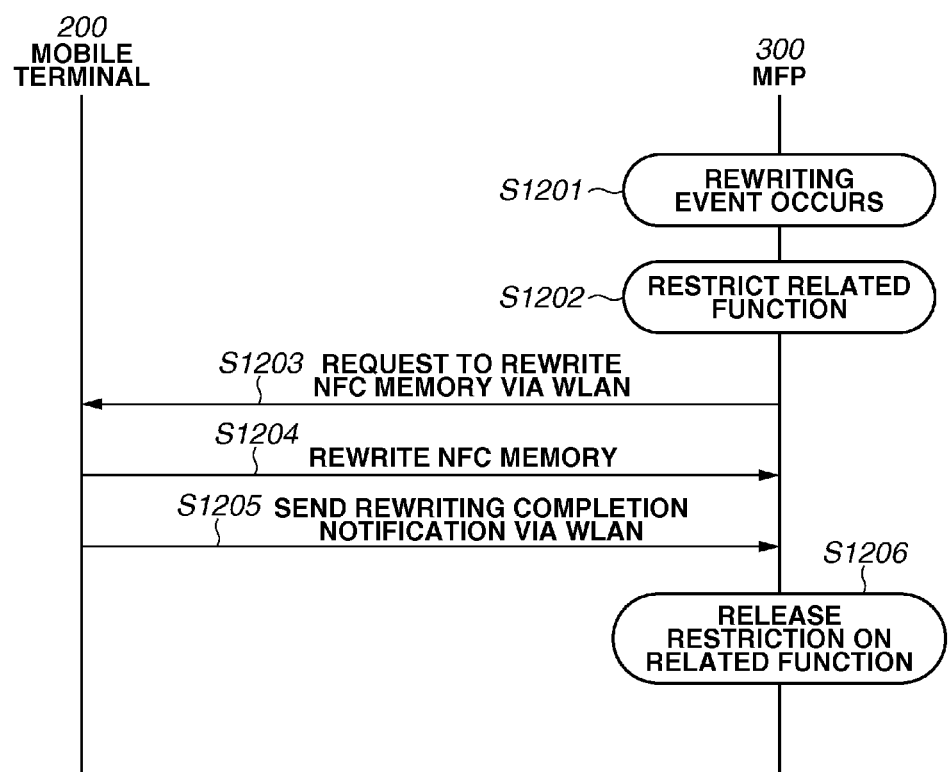
FIG. 12 illustrates a sequence performed when an event involving the rewriting of NFC tag occurs in the MFP.

FIG. 12 illustrates a sequence performed when an event involving the rewriting of the NFC memory 705 occurs. When an event involving the rewriting of the NFC memory 705 occurs in step S1201, then in step S1202, the MFP 300 determines whether function restriction is required for the event which has occurred. For example, when a NW setting related to handover is changed on the operation display unit 305 of the MFP 300, the MFP 300 determines that function restriction is required. More specifically, when a NW setting related to handover is changed on the operation display unit 305 of the MFP 300, handover is disabled. Therefore, MFP 300 invalidates the communication module to be used in handover. In step S1203, the MFP 300 requests the administrator mobile terminal 20 to rewrite the NFC memory 705 via WLAN. In step S1204, the administrator mobile terminal 20 rewrites the contents of the NFC memory 705 as required. When the rewriting is successfully completed, in step S1205, the administrator mobile terminal 20 transmits a rewriting completion notification to the MFP 300 via WLAN. In step S1206, the MFP 300 releases the function restriction (validates the communication module to be used in handover). Through the execution of control illustrated in FIG. 12, it becomes possible to prevent the MFP 300 from performing an incorrect action in a case where an inconsistency occurs between the status of the MFP 300 and the contents of the NFC memory 705. When the status of the MFP 300 changes, for example, in the case of a NW setting change or ink-out, the MFP 300 according to the present application transmits to a terminal apparatus the changed information which should be written to a non-contact IC tag. Upon reception of the changed information which should be written to the non-contact IC tag, the terminal apparatus performs processing for writing the changed information to the non-contact IC tag of the MFP 300, and transmits a write processing completion notification to the MFP 300. The above-described processing enables maintaining the consistency between the status of the MFP 300 and the contents of the NFC memory 705.

Figure 13:
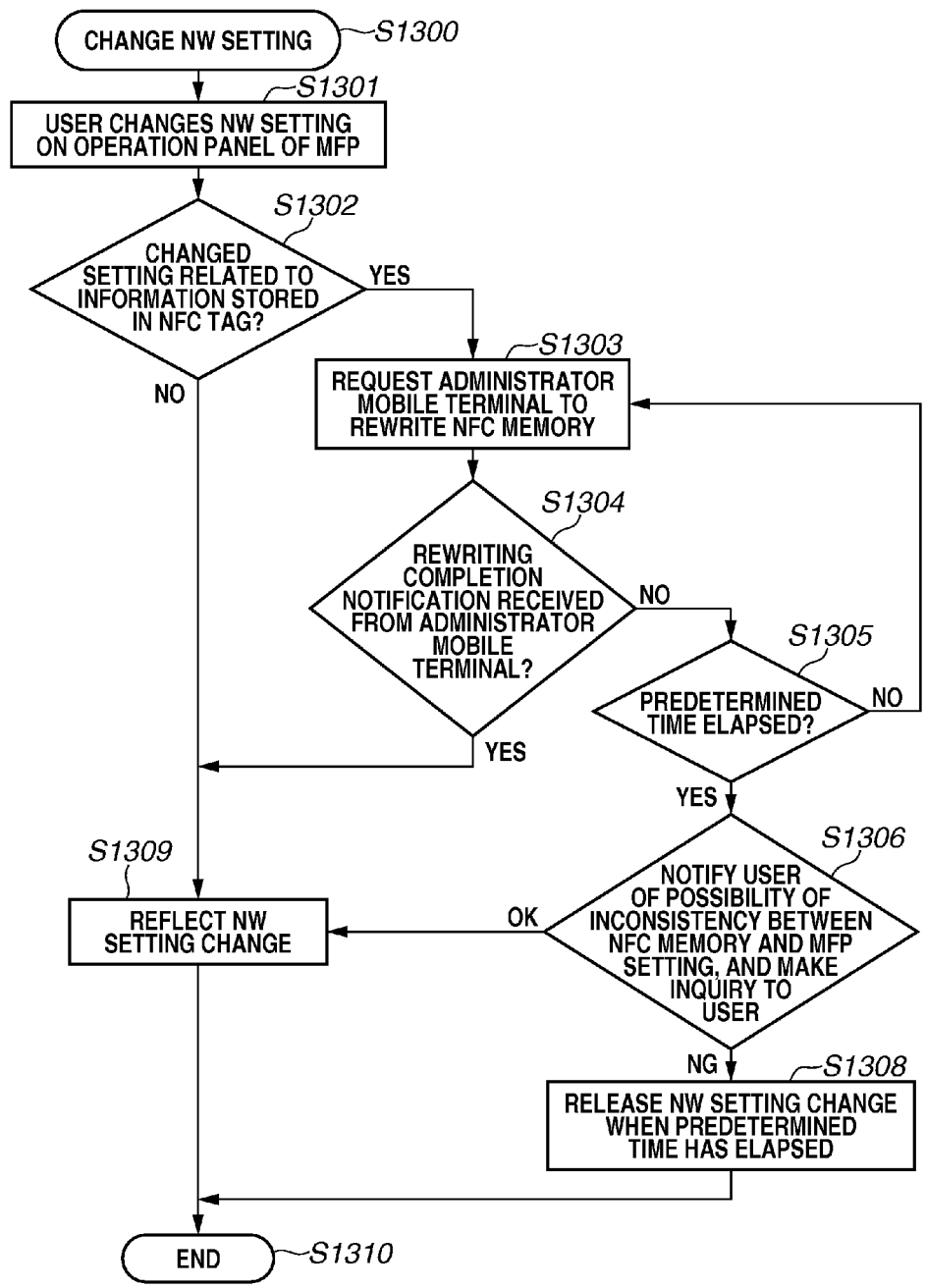
FIG. 13 is a flowchart illustrating processing performed when a network setting is changed in the MFP.

A flowchart for changing a NW setting of the MFP 300 will be described below with reference to FIG. 13. Steps of flowcharts executed by the MFP 300 according to the present application are implemented when the CPU 502 reads and executes programs stored in the memory.

The processing starts with step S1300 and proceeds to step S1301. In step S1301, the MFP 300 receives from the user a change of a NW setting related to handover via the operation display unit 305 of the MFP 300. In step S1302, the MFP 300 determines whether the changed setting is related to information stored in the NFC tag 700. For example, when the user changes a NW timeout setting which is not related to the contents stored in the user area 905 (the MFP 300 makes a determination of "NO" in step S1302), the processing proceeds to step S1309. However, if the WLAN connection information is changed, an inconsistency will arise, for example, when a user who wants to perform handover touches the NFC tag 700. Therefore, when the WLAN connection information is changed (the MFP 300 makes a determination of "YES" in step S1302), then in step S1303, the MFP 300 requests the administrator mobile terminal 20 to rewrite the contents of the NFC memory 705. Although a changed NW setting is included in the rewriting request transmitted in step S1303, the rewriting request and the changed NW setting may be separately transmitted. Since the NW setting to be transmitted should be written to the non-contact IC tag, NW setting information to be transmitted is generated, for example, so that the information fits into a data size storable in the NFC memory 705 of the non-contact IC tag. When an MFP's information acquisition request is issued from a personal computer as an external apparatus different from the MFP 300, the MFP 300 is also able to transmit a changed NW setting to the personal computer. The information acquisition request from the personal computer is issued, for example, via a printer driver installed in the personal computer or via a remote user interface (UI) displayed when the Internet Protocol (IP) address of the MFP 300 are input to a browser of the personal computer.

In step S1304, the MFP 300 determines whether a rewriting completion notification has been received from the administrator mobile terminal 20. When the MFP 300 determines that the rewriting completion notification has been received (YES in step S1304), the processing proceeds to step S1309. On the other hand, when the MFP 300 determines that the rewriting completion notification has not been received (NO in step S1304), then in step S1305, the MFP 300 determines whether a predetermined time period has elapsed. When the predetermined time period has not elapsed (NO in step S1305), the processing returns to step S1303. On the other hand, when the predetermined time period has elapsed (YES in step S1305), then in step S1306, the MFP 300 notifies the user of the possibility of an inconsistency between the contents of the NFC memory 705 and the settings of the MFP 300, and makes an inquiry to the user about the user's selection. When the user selects changing of the relevant memory contents (OK in step S1306), the processing proceeds to step S1309. On the other hand, when the user does not select changing of the relevant memory contents (NG in step S1306), the processing proceeds to step S1308.

In step S1308, the MFP 300 determines that the administrator mobile terminal 20 did not change the contents of the NFC memory 705, and cancels the NW setting change made in step S1301. Then, the processing exits this flowchart. In step S1309, the MFP 300 reflects the NW setting change. In step S1310, the processing exits this flowchart.

In the present exemplary embodiment, when the NW setting related to handover is changed, the changed NW setting can be reflected in the NFC tag 700.

A second exemplary embodiment will be described below. The present exemplary embodiment will be described below with reference to FIGS. 14A, 14B, and 14C based on a case where a printer error occurs as another example of an event involving the rewriting of the NFC memory 705. In particular, this example assumes a case where ink-out occurs in the recording unit 515 of the MFP 300. Through the execution of certain processing (described below), the user mobile terminal 30 does not transmit a print job to the MFP 300 via handover while ink-out occurs in the MFP 300. This processing allows the MFP 300 to omit a useless activation operation in a situation where print processing is not executable.

Figure 14A:
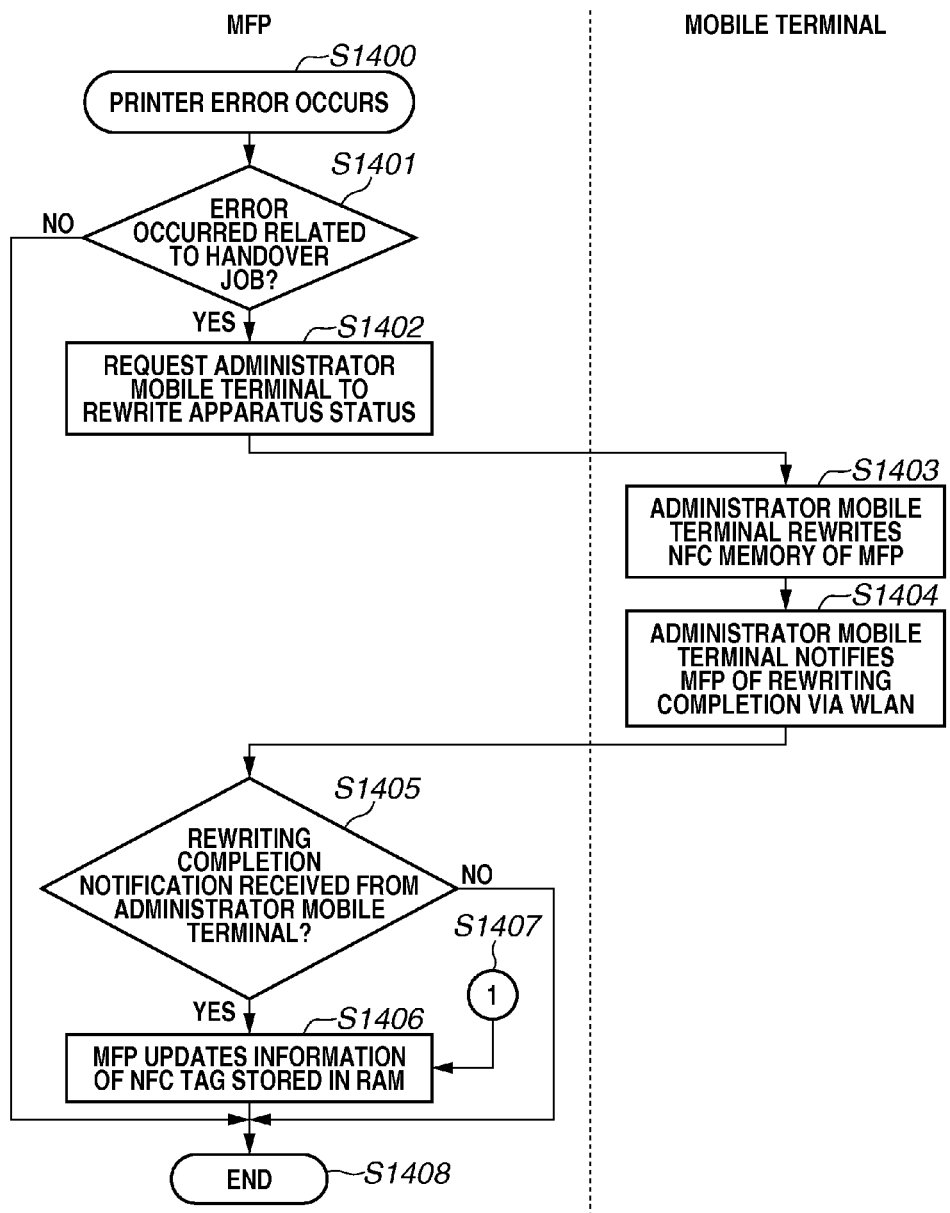

FIG. 14A is a flowchart illustrating processing performed when a printer error occurs. This processing writes information indicating the printer error while maintaining the consistency between the NFC memory 705 and the apparatus status storage unit 806. The processing starts with step S1400 and proceeds to step S1401. In step S1401, the MFP 300 determines whether the error disturbs the execution of a handover job. More specifically, the MFP 300 determines whether the error affects a handover job. In the case of ink-out, printing is not possible and therefore a print job transmitted via handover cannot be executed. Therefore, the MFP 300 determines that the error is related to handover (YES in step S1401). In step S1402, the MFP 300 requests the administrator mobile terminal 20 to rewrite the apparatus status 909. A rewriting target content is included in the rewriting request transmitted to the administrator mobile terminal 20 in step S1402. In the present exemplary embodiment, since the MFP 300 requests the administrator mobile terminal 20 to write the ink-out state to the apparatus status 909, information indicating the ink-out state is included in the rewriting request transmitted in step S1402.

In step S1403, the administrator mobile terminal 20 rewrites the apparatus status 909 of the NFC memory 901 of the MFP 300 to the ink-out state. When the rewriting is successfully completed, in step S1404, the administrator mobile terminal 20 transmits a rewriting completion notification to the MFP 300 via WLAN. In step S1405, the MFP 300 determines whether the rewriting completion notification has been received from the administrator mobile terminal 20. When the rewriting completion notification is determined to have been received (YES in step S1405), then in step S1406, the MFP 300 updates information of the apparatus status storage unit 806 (to the ink-out state in the present exemplary embodiment). In step S1408, the processing exits the flowchart illustrated in FIG. 14A.

FIG. 14B is a flowchart illustrating print processing via handover. The processing starts with step S1409 and proceeds to step S1410. The user brings the user mobile terminal 30 (the NFC unit 201) to the proximity of the NFC tag 306 of the MFP 300. In step S1410, the user mobile terminal 30 acquires the apparatus status 909 from the NFC tag 306. In step S1411, based on the acquired apparatus status 909, the user mobile terminal 30 determines whether a print job is executable via handover. When the error which has occurred in the MFP 300 disturbs the execution of handover, in step S1412, the user mobile terminal 30 displays the error on the display unit 203 without executing handover. Then, the processing exits this flowchart. More specifically, based on the information acquired from the NFC tag 306, the user mobile terminal 30 is able to recognize that handover is not possible, without activating the MFP 300. As a result, it becomes possible to prevent the user from waiting and reduce the power consumption during the activation of the MFP 300. When the apparatus status is determined to be not an error (NO in step S1411), then in step S1413, the mobile terminal 200 switches the communication method to WLAN and transmits a print job via handover. In step S1414, the MFP 300 turns power on, returns from the sleep state, and executes the print job received via handover. In step S1415, the MFP 300 determines whether a printer error has occurred in order to determine whether the print job received via handover is executable. When a printer error is determined to have occurred (YES in step S1415), then in step S1417, the MFP 300 does not execute the print job. In step S1418, the MFP 300 notifies the user mobile terminal 30 that printing has not been executed because of an error, and requests the user mobile terminal 30 to write the printer error occurrence state (the ink-out state) to the apparatus status 909. At this timing, similar to steps S1002 and S1003, the MFP 300 informs the user mobile terminal 30 of the NFC control password. Upon reception of the request, for example, a message "Bring Mobile Terminal Close To NFC Tag" may be displayed on the user mobile terminal 30. In step S1419, the user mobile terminal 30 rewrites the apparatus status 909 of the NFC memory 901 of the MFP 300 to the ink-out state by using the NFC control password and the error occurrence state (the ink-out state). When the rewriting is successfully completed, in step S1420, the user mobile terminal 30 transmits a rewriting completion notification to the MFP 300 via WLAN, and the processing proceeds to step S1421. Thus, when the print job received via handover is not executed because of the printer error of the MFP 300, even a mobile terminal other than the administrator mobile terminal 20 is able to update the contents of the NFC memory 705 as required by temporarily notifying the user mobile terminal 30 of the NFC control password.

FIG. 14C is a flowchart illustrating processing performed when the printer error is released. The processing starts with step S1423 and proceeds to step S1424. In step S1424, the MFP 300 determines whether the printer error has been written to the NFC memory 705 based on the information stored in the apparatus status storage unit 806. When it is determined that the printer error has been written to the NFC memory 705 (YES in step S1424), the processing proceeds to step S1425. The apparatus status storage unit 806 also stores information about the rewriting completion notification. Therefore, the MFP 300 is able to perform the determination processing in step S1424 by using the information about the rewriting completion notification for the apparatus status storage unit 806.

In step S1425, since the printer error has been cancelled, the MFP 300 requests the administrator mobile terminal 20 to rewrite the information in the NFC memory 705. Information transmitted to the administrator mobile terminal 20 via this request includes information indicating the ink present state. The administrator brings the administrator mobile terminal 20 to the proximity of the NFC tag 306 of the MFP 300. As a result, in step S1426, the administrator mobile terminal 20 rewrites the apparatus status 909 of the NFC memory 901 of the MFP 300 from the ink-out state to the ink present state. When the rewriting is successfully completed, in step S1427, the administrator mobile terminal 20 transmits a rewriting completion notification to the MFP 300 via WLAN. In step S1428, the MFP 300 determines whether the rewriting completion notification has been received from the administrator mobile terminal 20. When the rewriting completion notification is determined to have been received (YES in step S1428), then in step S1429, the MFP 300 updates the information in the apparatus status storage unit 806 with the contents indicating that the printer error has been cancelled. In step S1430, the processing exits this flowchart.

In the present exemplary embodiment, even in a case where an error affecting handover occurs in the MFP 300, the changed status is written to the NFC tag 306. As a result, the user is able to know that the MFP 300 is in an error state when the user brings the mobile terminal to the proximity of the NFC tag 306 to perform handover. This enables addressing such a problem that a print job is uselessly transmitted and a problem that the MFP 300 is uselessly activated.

A third exemplary embodiment will be described below. The present exemplary embodiment will be described below with reference to FIGS. 15A and 15B based on a case where the user authority of the MFP 300 is changed, which is another example of an event involving the rewriting of the NFC memory 705. In this example, the user authority of the MFP 300 is managed by using the NFC tag 306. When a user who wants to use the MFP 300 brings the mobile terminal to the proximity of the NFC tag 306, the locked state of the MFP 300 is cancelled and the MFP 300 enters the operable state.

Figure 16:
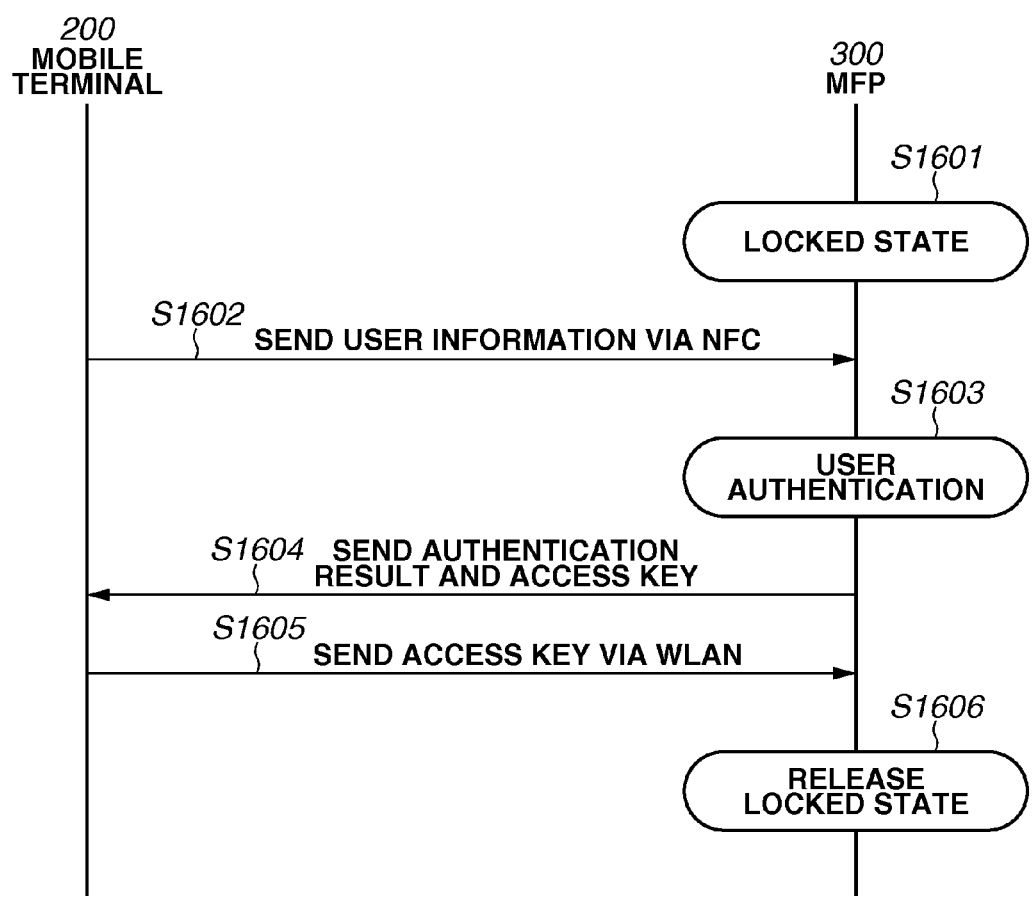
FIG. 16 illustrates a sequence for performing user authentication using the NFC tag.

A method for authenticating the user authority of the MFP 300 via NFC will be described below with reference to FIG. 16. In step S1601, the MFP 300 is in the locked state and therefore is not usable. In step S1602, the user who wants to use the MFP 300 brings the user mobile terminal 30 to the proximity of the NFC tag 306 to transmit user information. The user information includes, for example, a mobile terminal telephone number, a preregistered user ID, and any other types of information as long as a user is uniquely recognizable. In step S1603, the NFC tag 306 compares the received ID with a user list it holds to perform user authentication. In step S1604, when the user has the user authority (the authentication result is OK), the MFP 300 transmits an access key to the mobile terminal 200. In step S1605, the mobile terminal 200 transmits the received access key to the MFP 300 via WLAN. In step S1606, the MFP 300 cancels the locked state. As a result, the MFP 300 enters the operable state. As described above, there is an authentication method using a passive type NFC tag. The MFP 300 is also able to cancel the locked state through user authentication by using the operation display unit 305. The passive type NFC tag is not able to communicate with the main board 501 of the MFP 300. Therefore, if only information of user authority settings 805 stored in the nonvolatile memory 505 is changed when the user wants to change the user authority, an inconsistency may arise in the user authority settings 908 in the NFC memory 901.

Figure 15B:
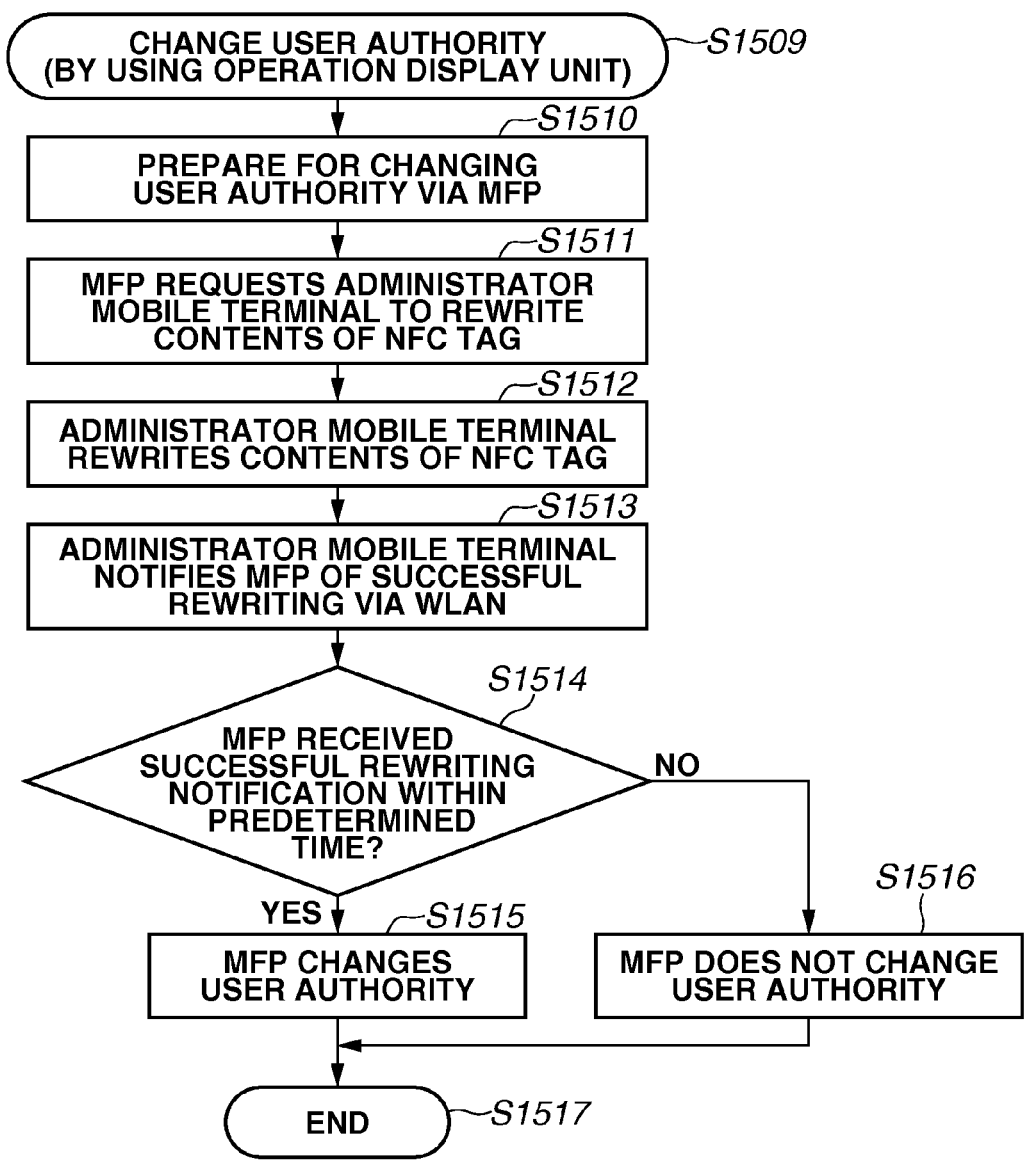

A flowchart of processing for changing the user authority to reduce the possibility of the occurrence of an inconsistency will be described below with reference to FIGS. 15A and 15B. FIG. 15A illustrates a case where the user authority is changed by using an application of the administrator mobile terminal 20, and FIG. 15B illustrates a case where the user authority is changed by using the operation display unit 305.

Referring to the flowchart in FIG. 15A, the processing starts with step S1501 and proceeds to step S1502. In step S1502, the administrator mobile terminal 20 receives an input for changing the user authority via an application of the administrator mobile terminal 20. In step S1503, the administrator mobile terminal 20 makes an inquiry to the MFP 300 via WLAN about whether the input information can be changed. When NG (information indicating that change is not permitted) is received (NG in step S1503), then in step S1508, the processing exits the flowchart illustrated in FIG. 15A. Cases where NG is received include a case where the administrator mobile terminal 20 is not authenticated by the MFP 300, a case where the change target content has a problem, and a case where the MFP 300 is being used. On the other hand, when OK (information indicating that change is permitted) is received (OK in step S1503), then in step S1504, the administrator mobile terminal 20 issues an instruction to temporarily restrict the MFP 300's use of the terminal apparatus via WLAN. When the administrator brings the administrator mobile terminal 20 to the proximity of the NFC tag 306 of the MFP 300, in step S1505, the administrator mobile terminal 20 updates the user authority settings 908 of the NFC tag 306 based on the input content. In S1506, the administrator mobile terminal 20 transmits a successful rewriting notification to the MFP 300 via WLAN. Upon reception of the successful rewriting notification, in step S1507, the MFP 300 rewrites the user authority settings 805. In step S1508, the MFP 300 cancels the temporary restriction on the use of the terminal apparatus, and transmits a rewriting completion notification to the administrator mobile terminal 20 via WLAN. The administrator mobile terminal 20 notifies the user that the user authority has been changed (displays the relevant information on the administrator mobile terminal 20). In step S1508', the processing exits this flowchart.

Referring to the flowchart in FIG. 15B, the processing starts with step S1509 and proceeds to step S1510. In step S1510, the MFP 300 receives user authority change contents by using the operation display unit 305 of the MFP 300. Upon completion of the user authority change, in step S1511, the MFP 300 requests the administrator mobile terminal 20 to rewrite the NFC tag 306 via WLAN. In this case, the MFP 300 notifies the administrator mobile terminal 20 of the rewriting target contents via WLAN. In step S1512, the administrator mobile terminal 20 changes the user authority settings 908 of the NFC tag 306 by using the received rewriting target contents. In step S1513, the administrator mobile terminal 20 transmits a successful rewriting notification to the MFP 300 via WLAN. In step S1514, the MFP 300 waits for a successful rewriting notification from the administrator mobile terminal 20. When the notification has been received within a predetermined time period (YES in step S1514), then in step S1515, the MFP 300 changes the user authority. On the other hand, when the notification has not been received within the predetermined time period (NO in step S1514), then in step S1516, the MFP 300 cancels the contents input in step S1510 without changing the user authority. In step S1517, the processing exits this flowchart.

According to the present exemplary embodiment, the user authority can be also changed by using a passive type NFC tag while maintaining the consistency between the contents of the NFC tag 306 and the contents of the nonvolatile memory 505 of the MFP 300.

Figure 17:
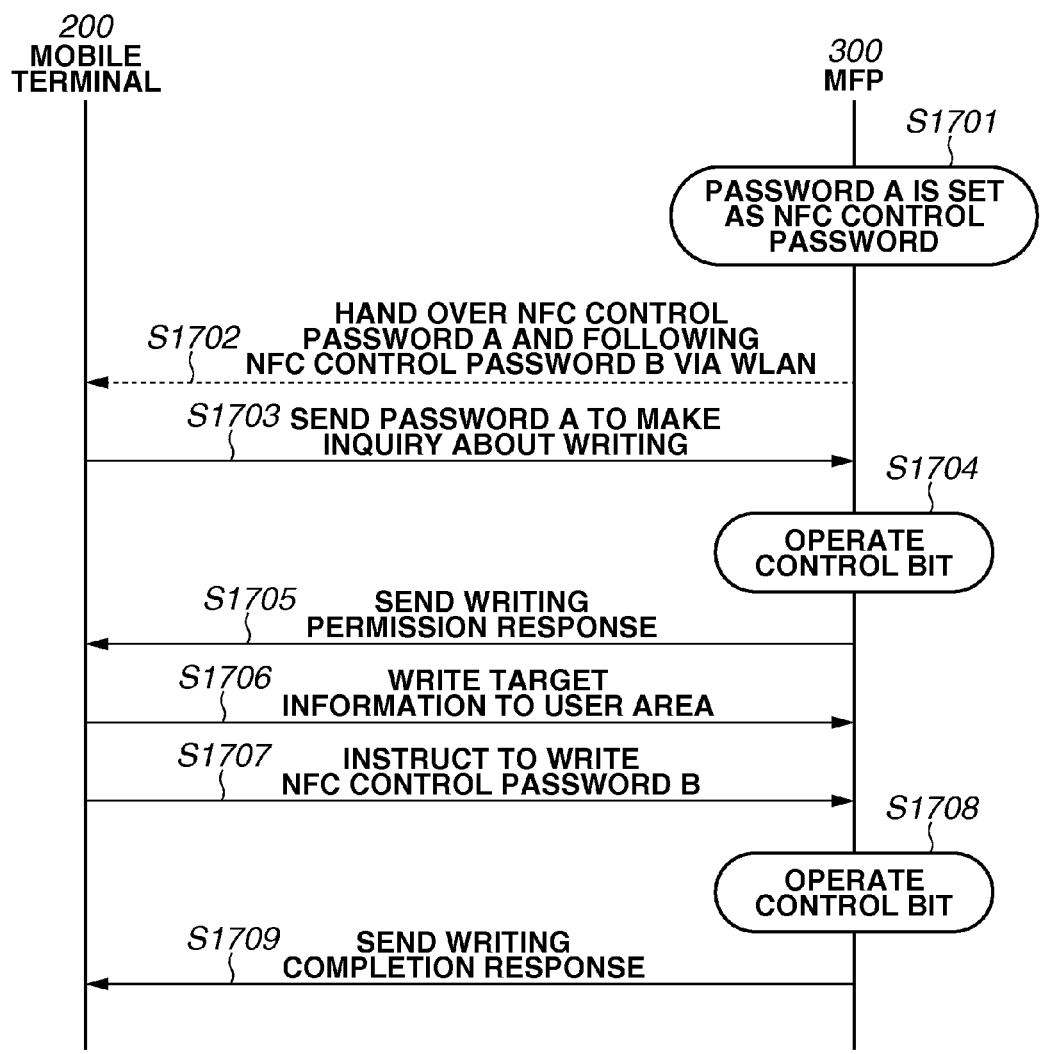
FIG. 17 illustrates a sequence for changing a password of the NFC tag.

A fourth exemplary embodiment will be described below. The present exemplary embodiment will be described below based on a case where the current NFC control password A and the following NFC control password B are handed over to the mobile terminal 200 to enhance security when the MFP 300 requests the mobile terminal 200 to rewrite the NFC tag 306. Referring to FIG. 17, the position at which the NFC control password B is handed over to the mobile terminal 200 is different from that in the sequence illustrated in FIG. 10. More specifically, in step S1702, the MFP 300 hands over both the NFC control password A and the following NFC control password B to the mobile terminal 200 via WLAN. The NFC control password B may be transmitted to the mobile terminal 200 in an encrypted format. In step S1707, the mobile terminal instructs the MFP 300 to write the NFC control password B to change the password. Performing the processing in this way enables the MFP 300 to change the password each time the NFC tag 306 is rewritten, thus enhancing security.

Although, in the present application, the MFP 300 is used as an example of an information processing apparatus, other apparatuses may be used. For example, the processing of the present application may be executed by a personal computer. Although, in the present application, a non-contact IC tag is stuck on the MFP 300, the configuration is not limited thereto. As another example, a non-contact IC tag may be inserted into the MFP 300, or a non-contact IC tag may be included in a case provided on the MFP 300. More specifically, the information processing apparatus may be any apparatus as long as it is capable of mounting a non-contact IC tag.

The present invention is also achieved by executing the following processing. More specifically, software (programs) for implementing the above-described functions of the above-described exemplary embodiments is supplied to a system or apparatus via a network or various types of storage media, and a computer (or CPU or micro processing unit (MPU)) of the system or apparatus reads and executes the programs. The programs may be executed either by one computer or a plurality of computers in a collaborating way. Further, hardware such as a circuit for executing a part of the programs may be provided, and the hardware and the computer for executing the software may operate in a collaborating way to implement the processing described in the present exemplary embodiment.

According to the present invention, it becomes possible to suitably reflect an apparatus status on a non-contact IC.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-075828 filed Apr. 1, 2014, which is hereby incorporated by reference herein in its entirety.

What is claimed is:

1. An information processing apparatus on which a non-contact integrated circuit (IC) tag can be mounted, the information processing apparatus comprising:
a transmitting unit configured to transmit to a terminal apparatus, when a state of the information processing apparatus changes, changed information related to the changed state,
wherein a central processing unit (CPU) of the information processing apparatus cannot communicate with the non-contact IC tag, and
wherein the changed information is written in the non-contact IC tag if the terminal apparatus is brought to the proximity of the non-contact IC tag.

2. The information processing apparatus according to claim 1, further comprising a receiving unit configured to receive a completion notification indicating a completion of write processing from the terminal apparatus,
wherein, when a network setting of the information processing apparatus is changed, a changed network setting is transmitted to the terminal apparatus, and
wherein, when the completion notification indicating the completion of the processing for writing the changed network setting to the non-contact IC tag is received, the changed network setting is reflected.

3. The information processing apparatus according to claim 2, wherein, if the completion notification is not received when a predetermined time period has elapsed after the changed network setting is transmitted, the information processing apparatus makes an inquiry about whether to reflect the changed network setting.

4. The information processing apparatus according to claim 1, wherein, when an error which has occurred in the information processing apparatus affects a print job received via wireless communication established based on information stored in the non-contact IC tag, the transmitting unit transmits, to the terminal apparatus, information about the error.

5. The information processing apparatus according to claim 1, wherein the non-contact IC tag is stuck on the information processing apparatus.

6. The information processing apparatus according to claim 1, wherein the information processing apparatus is a printing apparatus.

7. The information processing apparatus according to claim 1, wherein the non-contact IC tag is a Near Field Communication tag.

8. A control method executed by an information processing apparatus on which a non-contact integrated circuit (IC) tag can be mounted, the control method comprising:
transmitting to a terminal apparatus, when a state of the information processing apparatus changes, changed information related to the changed state,
wherein a central processing unit (CPU) of the information processing apparatus cannot communicate with the non-contact IC tag, and
wherein the changed information is written in the non-contact IC tag if the terminal apparatus is brought to the proximity of the non-contact IC tag.

9. The control method according to claim 8, further comprising receiving a completion notification indicating a completion of write processing from the terminal apparatus,
wherein, when a network setting of the information processing apparatus is changed, a changed network setting is transmitted to the terminal apparatus, and
wherein, when the completion notification indicating the completion of the processing for writing the changed network setting to the non-contact IC tag is received, the changed network setting is reflected.

10. The control method according to claim 8, wherein, if the completion notification is not received when a predetermined time period has elapsed after the changed network setting is transmitted, the information processing apparatus makes an inquiry about whether to reflect the changed network setting.

11. The control method according to claim 8, wherein, when an error which has occurred in the information processing apparatus affects a print job received via wireless communication established based on information stored in the non-contact IC tag, transmitting includes transmitting, to the terminal apparatus, information about the error.

12. The control method according to claim 8, wherein the non-contact IC tag is stuck on the information processing apparatus.

13. The control method according to claim 9, wherein the information processing apparatus is a printing apparatus.

14. The control method according to claim 8, wherein the non-contact IC tag is a Near Field Communication tag.

15. The control method according to claim 8, wherein the change of a state of the information processing apparatus is one of a change of network information of the information processing apparatus and an occurrence of an error in the information processing apparatus.

16. A non-transitory storage medium storing a program to perform a control method for an information processing apparatus on which a non-contact integrated circuit (IC) tag can be mounted, the control method comprising:
transmitting to a terminal apparatus, when a state of the information processing apparatus changes, changed information related to the changed state, wherein a central processing unit (CPU) of the information processing apparatus cannot communicate with the non-contact IC tag, and wherein the changed information is written in the non-contact IC tag if the terminal apparatus is brought to the proximity of the non-contact IC tag.

17. The non-transitory storage medium according to claim 16, the control method further comprising receiving a completion notification indicating a completion of write processing from the terminal apparatus, wherein, when a network setting of the information processing apparatus is changed, a changed network setting is transmitted to the terminal apparatus, and wherein, when the completion notification indicating the completion of the processing for writing the changed network setting to the non-contact IC tag is received, the changed network setting is reflected.

18. The non-transitory storage medium according to claim 16, wherein, if the completion notification is not received when a predetermined time period has elapsed after the changed network setting is transmitted, the information processing apparatus makes an inquiry about whether to reflect the changed network setting.

19. The non-transitory storage medium according to claim 16, wherein, when an error which has occurred in the information processing apparatus affects a print job received via wireless communication established based on information stored in the non-contact IC tag, transmitting includes transmitting, to the terminal apparatus, information about the error.

20. The non-transitory storage medium according to claim 16, wherein the non-contact IC tag is a Near Field Communication tag.

* * * * *